(12) United States Patent
Innes et al.

(10) Patent No.: US 7,537,424 B2
(45) Date of Patent: May 26, 2009

(54) APPARATUS AND METHOD FOR HANDLING PIPE SECTIONS

(75) Inventors: Ronald W. Innes, Edmonton (CA);
Dustyn J. Elford, Edmonton (CA);
Ronald E. Foster, Gibbons (CA); John T. Hackett, Beaumont (CA); Tan N. Nguyen, Edmonton (CA); Daniel P. Teeuwsen, Edmonton (CA)

(73) Assignee: MARL Technologies, Inc., Edmonton, Alberta (CA)

( * ) Notice: Subject to any disclaimer, the term of this patent is extended or adjusted under 35 U.S.C. 154(b) by 120 days.

(21) Appl. No.: 10/556,108

(22) PCT Filed: Oct. 7, 2005

(86) PCT No.: PCT/CA2005/001534
§ 371 (c)(1),
(2), (4) Date: Nov. 8, 2005

(87) PCT Pub. No.: WO2007/041822
PCT Pub. Date: Apr. 19, 2007

(65) Prior Publication Data
US 2007/0092358 A1 Apr. 26, 2007

(51) Int. Cl.
*E21B 19/00* (2006.01)
*E21B 19/14* (2006.01)

(52) U.S. Cl. .................. 414/22.62; 211/70.4

(58) Field of Classification Search ............ 414/22.54, 414/22.55, 22.62, 22.65, 22.66, 22.68, 22.69, 414/22.71, 745.4, 745.8, 746.4, 746.8, 267, 414/276, 796.5, 796.7, 796.9, 421; 211/70.4; 405/154.1; 175/161, 52, 85; 410/36, 42; 10/22.54, 22.55, 22.62, 22.65, 22.66, 22.68, 10/22.69, 22.71, 745.4, 745.8, 746.4, 746.8, 10/267, 276, 796.5, 796.7, 796.9
See application file for complete search history.

(56) References Cited

U.S. PATENT DOCUMENTS

| | | | |
|---|---|---|---|
| 2,260,697 A * | 10/1941 | Allen | 414/421 |
| 2,711,838 A * | 6/1955 | Avery | 414/421 |
| 2,807,441 A | 9/1957 | Sewell | |
| 2,848,196 A | 8/1958 | Simmonds | |
| 2,894,723 A | 7/1959 | Gustafson | |
| 3,254,776 A * | 6/1966 | Brown | 414/22.61 |
| 3,280,920 A | 10/1966 | Scott | |
| 3,527,309 A | 9/1970 | Rassieur | |

(Continued)

FOREIGN PATENT DOCUMENTS

| GB | 2083106 | 3/1982 |
|---|---|---|
| SE | WO9958812 | 11/1999 |
| WO | WO 00/55470 | 9/2000 |

*Primary Examiner*—Gregory W Adams
(74) *Attorney, Agent, or Firm*—Terrence N. Kuharchuk; Rodman & Rodman

(57) ABSTRACT

An apparatus and method for handling pipe sections, preferably for use with a drilling head. The apparatus includes a storage bin defining a substantially fixed bin dispensing position, a transfer device for individually transferring a pipe section between the bin dispensing position and a pipe transfer position, and a handling device for individually moving the pipe section between the pipe transfer position and a drilling head interface position. The method includes presenting a pipe section to the bin dispensing position, moving the transfer device to the bin dispensing position to engage the pipe section at the bin dispensing position, transferring the pipe section with the transfer device from the bin dispensing position to the pipe transfer position, engaging the pipe section with the handling device at the pipe transfer position, and moving the pipe section with the handling device from the pipe transfer position to the drilling head interface position.

31 Claims, 20 Drawing Sheets

U.S. PATENT DOCUMENTS

| | | | |
|---|---|---|---|
| 3,630,392 A * | 12/1971 | Cintract et al. | 414/746.8 |
| 3,717,270 A * | 2/1973 | Rooke et al. | 414/414 |
| 3,734,208 A * | 5/1973 | Otto | 175/52 |
| 3,734,210 A * | 5/1973 | Wilderman | 175/85 |
| 3,768,663 A * | 10/1973 | Turner et al. | 211/70.4 |
| 4,380,297 A * | 4/1983 | Frias | 211/70.4 |
| 4,628,781 A * | 12/1986 | Rowley | 83/371 |
| 5,004,055 A | 4/1991 | Porritt et al. | |
| 5,222,564 A | 6/1993 | Bonca | |
| 6,220,807 B1 * | 4/2001 | Sorokan | 414/22.62 |
| 6,311,788 B1 | 11/2001 | Weixler | |
| 2003/0170095 A1 | 9/2003 | Slettedal | |
| 2003/0196791 A1 | 10/2003 | Dunn et al. | |
| 2005/0139353 A1 | 6/2005 | Johnson | |

* cited by examiner

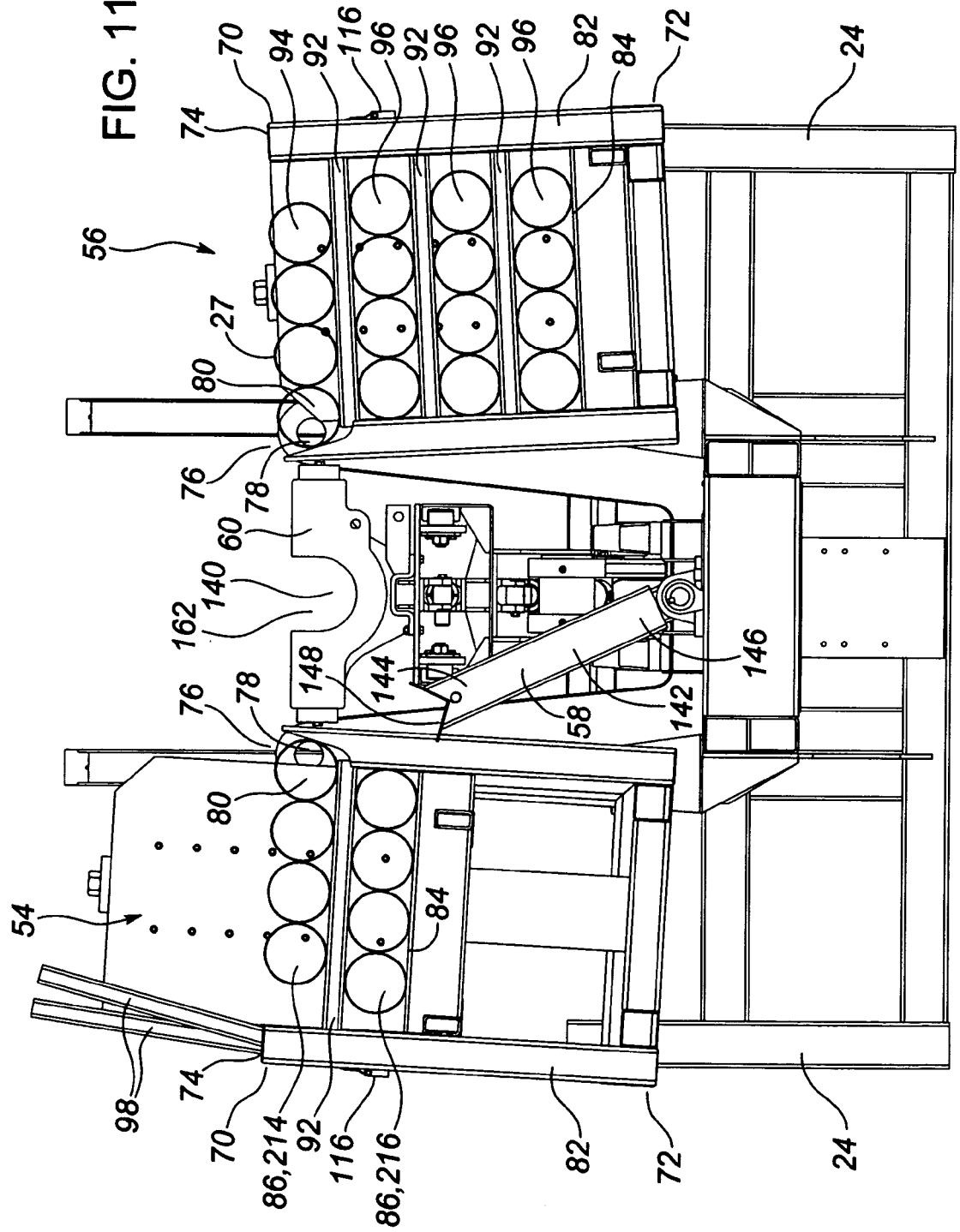

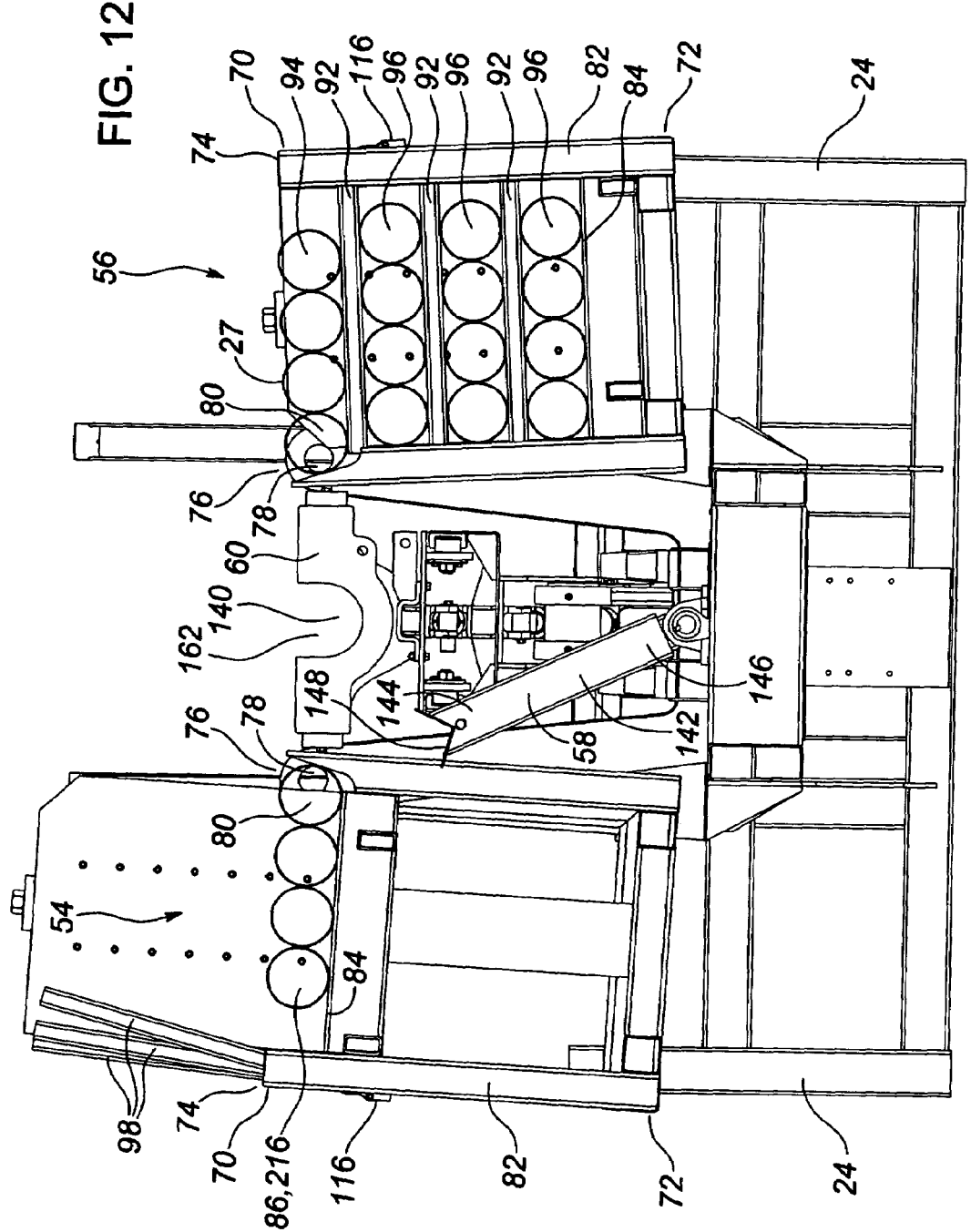

APPARATUS AND METHOD FOR HANDLING PIPE SECTIONS

TECHNICAL FIELD

An apparatus and a method for handling pipe sections.

BACKGROUND OF THE INVENTION

Boreholes may be drilled in the earth for many different purposes. As one example, boreholes may be drilled for the purpose of recovering oil and/or gas from subterranean formations. As a second example, boreholes may be drilled for use as water wells. As a third example, boreholes may be drilled for geotechnical, environmental or geo-environmental engineering purposes. As a fourth example, boreholes may be drilled for mineral exploration purposes.

A relatively recent development has been the drilling of boreholes for use in geothermal heat exchange systems. In a geothermal heat exchange system, the ground is used as both a heat source and a heat sink as an alternative to a boiler, furnace, air conditioner etc. in a conventional HVAC system. A geothermal heat exchange system typically involves the use of one or more "earth loops", which are constructed by drilling a borehole and then installing a heat exchange conduit loop in the borehole.

The drilling of boreholes is generally carried out using drilling rigs of various designs. Relatively robust and sophisticated drilling rigs are often used in oil and gas applications where the boreholes may be relatively deep and/or large in diameter and may be drilled in relatively harsh conditions. Relatively less robust and less sophisticated drilling rigs may often be used for drilling water wells and in geothermal heat exchange applications, since these boreholes tend to be relatively shallow and small in diameter.

In any event, the drilling rig includes a drilling head. A drilling head is a component of the drilling rig which imparts movement to a drill string in order to facilitate drilling. A drilling head is typically either a bottom drive drilling head or a top drive drilling head. The drilling head may also support the drill string, particularly where the drilling head is a top drive drilling head.

The drilling rig often further includes a derrick. A derrick is a structural component of the drilling rig which supports the drill string and associated drilling equipment such as the drilling head while the borehole is being drilled. A derrick may be comprised of any structure which is capable of performing these functions. A derrick may include a mast or may sometimes be referred to as a mast.

A drill string is a length of rod or pipe which extends from the drilling head to the bottom of the borehole during drilling and which typically includes a drill bit at its lower end. A drill string may consist of a continuous length of pipe such as a coiled tubing. More commonly, however, a drill string consists of short sections of rods or conduits described generally as "pipe sections" which are connected together as drilling progresses in order ultimately to provide a drill string of suitable length to drill the desired depth of the borehole. Typically the pipe sections are connected together with threaded box and pin connectors which are located on the opposed ends of the pipe sections.

Among the advantages of using pipe sections to construct a drill string are that the individual pipe sections are relatively easy to transport to and from the drilling site and are relatively easy to handle at the drilling site in comparison with coiled tubing. A disadvantage, however, of using pipe sections to construct a drill string is that procedures must be implemented at the drilling site to transfer the pipe sections to and from the derrick and to connect and disconnect the pipe sections to and from the derrick as drilling progresses.

These procedures are often time consuming and require the participation of several drilling personnel. In addition, these procedures may be inherently dangerous, since they involve the manipulation of the pipe sections, which although relatively short, are also relatively heavy and somewhat unwieldy.

As a result of the disadvantages associated with using pipe sections to construct drill strings, efforts have been made to automate the handling of pipe sections at the drilling site between the location where the pipe sections are stored and the derrick.

U.S. Pat. No. 3,280,920 (Scott) describes an apparatus for drilling wells which includes a mast, a supporting means associated with the mast for rotatably supporting drill pipe, and an elongate frame which is pivoted adjacent the lower end of the mast for swinging movement between a substantially horizontal position and an upright position in which the upper end of the frame is near the supporting means. The frame includes releasable clamps for gripping a section of drill pipe, which clamps are capable of limited reciprocating movement longitudinally of the frame so that sections of drill pipe can be held upright directly beneath the supporting means and can be delivered to the supporting means when the frame is in the upright position. During drilling, individual sections of drill pipe are manually rolled from a storage rack on the drilling floor to the frame, gripped by the clamps, and the frame is then raised by the swinging movement to transfer the sections of drill pipe to the mast. Following drilling, the procedure may be reversed to transfer sections of drill pipe back to the storage rack.

U.S. Pat. No. 3,734,208 (Otto) describes a truck mounted drilling rig which includes a transfer mechanism for transporting sections of drill pipe from a storage position to a drilling position beneath a drive unit mounted on an upright drilling rig mast. The transfer mechanism includes selection means on the drilling rig for removing a section of drill pipe from its storage position and placing it in a pick station, and a transfer arm pivotally attached to the drilling rig and operable to pick the section of drill pipe from the pick station and raise it to a ready station alongside the upright drilling rig mast. The selection means include fore and aft carriages which may be translated vertically to three unload positions on a storage rack which correspond to three tiers in the storage rack. The tiers are defined by cantilevered brackets which include rocker arms at their outer ends. Sections of drill pipe are supported on the three tiers in the storage rack and a section of drill pipe is individually discharged from the storage rack by tilting the rocker arm which is associated with a tier, causing the section of drill pipe to roll off the rocker arm and onto the fore and aft carriages at the appropriate unload position. The fore and aft carriages are then translated vertically to the pick station where the section of drill pipe is picked up by the transfer arm. The transfer arm grasps the section of drill pipe and pivots to raise the drill pipe to the ready station. The transfer arm then swings the section of drill pipe to the drilling position within the mast so that the drill pipe can be connected to the drive unit. The transfer mechanism reverses the above procedure to move sections of drill pipe from the drilling position back to their storage positions.

U.S. Pat. No. 3,734,210 (Wilderman) describes a truck mounted drilling unit which provides for adding and withdrawing sections of pipe to and from a drill string. The drilling unit includes a pipe handling arm which is adapted to grasp individual pipe sections and then pivot to swing the pipe sections between a lower generally horizontal position and a generally upward directed position at or in the mast. The drilling unit also includes two storage racks for the pipe sections, each of which has a bed supporting a plurality of vertically stacked layers of generally horizontally disposed pipe sections. The layers are separated from one another by manually placed spacers which are supported by underlying layers of pipe sections. The bed of each storage rack may be raised or lowered in order to enable one of the layers to be positioned adjacent the lower horizontal position taken by the pipe handling arm. A pipe transfer assembly is provided for individually transferring pipe sections between each of the storage racks and the pipe handling arm. Each pipe transfer assembly includes a pipe flipper associated with the storage rack and a horizontal support zone. The pipe flipper individually engages a pipe section and is actuated to push the pipe section onto the horizontal support zone. The pipe section rolls across the horizontal support zone to the pipe handling arm, where it is grasped by the pipe handling arm. The pipe handling arm then pivots to swing the pipe section through an open side of the mast to the upward directed position where it can be incorporated into the drill string. The above procedure is reversed in order to move pipe sections from the upward directed position back to the storage racks.

U.S. Pat. No. 6,311,788 (Weixler) describes a magazine and manipulation apparatus for drilling rod parts for a drill. The apparatus includes a multi-layered rod magazine in which the layers are separated by manually placed spacer beams which are supported by underlying layers of drilling rod parts, a charging device which transports the individual drilling rod parts to and from the drill, and a removal device for transferring the individual drilling rod parts between the rod magazine and the charging device. In order to facilitate the transport of drilling rod parts to the drill, the magazine pivots to direct the drilling rods toward or away from the removal device. The removal device is then moved vertically downward in order to remove a drilling rod part from the uppermost layer of the rod magazine. The removal device is then moved vertically upward and pivoted 180 degrees by a pivot mechanism in order to transfer the drilling rod part to a bearing unit associated with the charging device, where the drilling rod part is clamped by the charging device. The charging device then transports the drilling rod part to a perpendicular position so that the drilling rod part can be connected with a drilling train which includes a drilling head. In order to facilitate the transport of drilling rod parts back to the magazine, the above procedure is reversed.

U.S. Patent Application Publication No. US 2003/0170095 A1 (Slettedal), dated Sep. 11, 2003 describes a pipe handling device which includes a transport carriage for transporting pipes between a pipe rack and a place of use, wherein the transport carriage includes picking devices that are capable of picking up pipes at different levels in a pivotable layered pipe rack. The layers of the pipe rack are defined by supporting arms which support the pipes and which are swung to the side when a layer is empty to allow access to pipes supported on an underlying supporting arm. Each of the picking devices includes two picking columns. Each of the picking columns has a first picking arm which moves substantially vertically along one side of the picking column. The first picking arms are capable of lifting a horizontal pipe from the pipe rack. Each of the picking columns further includes a second picking arm which moves substantially vertically on the opposite side of the picking column as the first picking arm. In use of the device, a pipe is picked up from the uppermost layer of the pipe rack by the first picking arm and is carried vertically upward. As the pipe approaches the top of the picking column, the second picking arm is moved upward so that the pipe may be held between the first picking arm and the second picking arm. The picking arms then move the pipe vertically above the picking column so that the pipe can be gripped by grappler claws on a pipe erecting device. The pipe erecting device is then moved along horizontal guide rails in order to move the pipe erecting device from a horizontal position to a substantially vertical orientation adjacent a derrick. The grappler claws are then manipulated to move the pipe away from the pipe erecting device and toward the interior of the derrick so that the pipe can be connected into a drill string. In order to return the pipe to the pipe rack from the derrick, the above procedure is reversed.

U.S. Patent Application Publication No. US 2003/0196791 A1 (Dunn et al), dated Oct. 23, 2003 describes a pipe handling system which includes at least one pipe magazine, a pipe conveyor and a pipe arm. The pipe magazine includes vertically spaced horizontal slats for supporting pipe sections thereon and the pipe magazine is pivotable to direct the pipe sections contained therein toward or away from a vertical conveyor. The horizontal slats are individually movable toward the vertical conveyor. The vertical conveyor has a shovel arm for moving a pipe section along the vertical conveyor. The vertical conveyor extends upward to a set of horizontal conveyors. The horizontal conveyors also include shovel arms and extend horizontally to a horizontal position of the pipe arm. The pipe arm is pivotable about its lower end between the horizontal position and a vertical position. In the vertical position, the pipe arm is located at a staging position which is offset from the centerline of the wellbore being drilled. The pipe arm may be actuated to move from the staging position to the centerline of the wellbore. In use, a pipe section may be delivered to a drilling structure by tilting the pipe magazine toward the vertical conveyor, actuating one of the horizontal slats to extend it to the shovel arm on the vertical conveyor, allowing a pipe section to roll from the horizontal slat onto the shovel arm, moving the shovel arm with the vertical conveyor so that the pipe section can be transferred to the horizontal conveyors, moving the pipe section along the horizontal conveyors to the pipe arm, grasping the pipe section with the pipe arm, pivoting the pipe arm to deliver the pipe section to the staging position, and actuating the pipe arm to deliver the pipe section to the centerline of the wellbore. In order to deliver pipe sections back to the pipe magazine, the above procedure is reversed.

There remains a need for an apparatus and a method for handling pipe sections which is relatively simple and robust. There is also a need for an apparatus for handling pipe sections which is capable of accommodating pipe sections having different diameters either with no modification of the apparatus or with only minor modification of the apparatus.

SUMMARY OF THE INVENTION

The present invention is a pipe section handling apparatus and method for moving pipe sections between a storage location and some other location. The apparatus and method may be used in both drilling applications and non-drilling applications.

In preferred embodiments the invention is a pipe section handling apparatus and method for use with a drilling head, in which the primary purpose of the apparatus and method is to move pipe sections between a pipe storage location and a location where the pipe sections can be used by the drilling head. The drilling head may be associated with a derrick.

Preferably the drilling head is used to conduct drilling operations in a borehole, but the drilling head may also be used in non-drilling applications where pipe sections must be placed in or removed from a borehole. The drilling operations may be conducted to drill boreholes for any use or purpose, including, but not limited to, for oil and gas exploration and production, for mineral exploration, for use as water wells, for geotechnical, environmental and geo-environmental engineering purposes, and for use in geothermal heat exchange systems.

The pipe sections may be comprised of any type of elongated pipe, conduit, hollow rod or solid rod which may be supplied in sections, which sections may be connected together to form a string. Preferably the pipe sections are connected to each other using threaded connections. The string may be comprised of any length of connected sections of pipe, conduit or rod, but is preferably comprised of a drill string.

More particularly, the pipe sections making up the drill string are preferably comprised of cylindrical drill pipe or drill rod, but may also be comprised of square drill pipe, tubing, augers, or other drill string equipment such as drill bits, reamers and stabilizers.

In the apparatus and method, this primary purpose is achieved by moving the pipe sections amongst a bin dispensing position, a pipe transfer position and a drilling head interface position. Preferably one or more of these positions is substantially fixed. More preferably, at least the bin dispensing position is substantially fixed. Even more preferably, at least the bin dispensing position and the pipe transfer position are fixed. Most preferably, each of the bin dispensing position, the pipe transfer position and the drilling head interface position is substantially fixed.

The apparatus is comprised of a pipe storage bin which defines the bin dispensing position, a pipe transfer device for transferring a selected pipe section between the bin dispensing position and a pipe transfer position, and a pipe handling device for moving the selected pipe section between the pipe transfer position and a drilling head interface position. In some embodiments, the apparatus may further comprise the drilling head and/or the derrick.

The method is comprised of the basic steps of moving a selected pipe section amongst the bin dispensing position, the pipe transfer position and the drilling head interface position.

In one preferred apparatus aspect, the invention is a pipe handling apparatus for use with a drilling head, the apparatus comprising:

(a) a pipe storage bin for storing a plurality of pipe sections in a substantially horizontal pipe orientation, wherein the pipe storage bin is comprised of a bin pivot axis which is substantially parallel with the pipe orientation, wherein the pipe storage bin is pivotable about the bin pivot axis, and wherein the pipe storage bin defines a substantially fixed bin dispensing position as the pipe storage bin pivots about the bin pivot axis, whereby the pipe sections may be removed from the pipe storage bin at the bin dispensing position and whereby the pipe sections may be delivered to the pipe storage bin at the bin dispensing position;

(b) a pipe transfer device for individually transferring a selected pipe section between the bin dispensing position and a pipe transfer position; and (c) a pipe handling device for individually moving the selected pipe section between the pipe transfer position and a drilling head interface position.

In one preferred method aspect, the invention is a method of transferring a selected pipe section from a pipe storage bin to a drilling head interface position, the method comprising:

(a) presenting the selected pipe section to a substantially fixed bin dispensing position in the pipe storage bin;

(b) moving a pipe transfer device to the bin dispensing position in order to engage the selected pipe section with the pipe transfer device at the bin dispensing position;

(c) transferring the selected pipe section with the pipe transfer device from the bin dispensing position to a pipe transfer position;

(d) engaging the selected pipe section with a pipe handling device at the pipe transfer position; and (e) moving the selected pipe section with the pipe handling device from the pipe transfer position to the drilling head interface position.

The pipe storage bin pivots about the bin pivot axis in order to direct pipe sections toward or away from the bin dispensing position. If pipe sections are being moved from the pipe storage bin to the drilling head, the pipe storage bin pivots such that the pipe sections are directed by gravity to move toward the bin dispensing position. If pipe sections are being moved from the drilling head to the pipe storage bin, the pipe storage bin pivots such that the pipe sections are directed by gravity to move away from the bin dispensing position.

The bin dispensing position is the position in space at which pipe sections are either removed from the pipe storage bin or delivered to the pipe storage bin during use of the apparatus and performance of the method.

In order for the bin dispensing position to be substantially fixed, the bin pivot axis preferably substantially coincides with the bin dispensing position. The selected pipe section is preferably in a substantially horizontal orientation and is preferably aligned so that it is substantially parallel to the bin pivot axis when the selected pipe section is at the bin dispensing position.

The pipe storage bin is comprised of an upper end, a lower end, an outboard side and an inboard side. Preferably the pipe handling device is located adjacent to the inboard side of the pipe storage bin.

In some embodiments, the apparatus is comprised of more than one pipe storage bin. For example, in a preferred embodiment the apparatus is comprised of two pipe storage bins which are arranged so that the pipe handling device is between the pipe storage bins and so that the pipe handling device is adjacent to the inboard sides of both pipe storage bins. Where the apparatus is comprised of more than one pipe storage bin, preferably the pipe storage bins are identical or substantially identical in structure and function. The pipe storage bins may be configured to store pipe sections having the same diameter or different diameters.

The bin pivot axis may be located at any suitable location associated with the pipe storage bin. Preferably the bin pivot axis is located substantially at the upper end of the pipe storage bin. More preferably the bin pivot axis is located substantially at the upper end of the pipe storage bin and substantially at the inboard side of the pipe storage bin.

As a result, preferably the bin dispensing position is located substantially at the upper end of the pipe storage bin and substantially at the inboard side of the pipe storage bin. In this configuration, the pipe storage bin pivots inward in order to direct the pipe sections toward the bin dispensing position and pivots outward to direct the pipe sections away from the bin dispensing position.

The pipe storage bin preferably accommodates a plurality of layers of pipe sections. As a result, preferably the pipe storage bin is comprised of a spacer mechanism for defining a plurality of pipe storage layers in the pipe storage bin. The spacer mechanism provides a separation between adjacent pipe storage layers, which is desirable for facilitating removal of the pipe sections from the pipe storage bin.

The spacer mechanism may be comprised of any structure, apparatus or device which is capable of providing the separation between adjacent pipe storage layers. Preferably the height of each pipe storage layer is defined by the diameter of the pipe sections stored in the pipe storage layer and not by the spacer mechanism. As a result, preferably the spacer mechanism is configured so that it adapts to the diameter of the pipe sections being stored in the pipe storage layers. The pipe storage bin may be configured to store pipe sections all having the same diameter or pipe sections having different diameters. Preferably all of the pipe sections stored in a particular pipe storage layer have identical or substantially similar diameters.

In preferred embodiments, the spacer mechanism is comprised of one or more spacer bar assemblies, wherein a spacer bar assembly provides a separation between two adjacent pipe storage layers comprising an upper adjacent pipe storage layer and a lower adjacent pipe storage layer.

A single spacer bar assembly thus defines two pipe storage layers consisting of the upper adjacent pipe storage layer and the lower adjacent pipe storage layer. The apparatus preferably, however, comprises a plurality of spacer bar assemblies so that two pipe storage layers may be defined by more than one spacer bar assembly and so that the pipe storage bin is comprised of more than two pipe storage layers.

As one example, the pipe storage bin may be comprised of a forward end and a rearward end and two pipe storage layers may be defined by a forward spacer bar assembly and a rearward spacer bar assembly. As a second example, three pipe storage layers may be defined by two spacer bar assemblies, four pipe storage layers may be defined by three spacer bar assemblies, and so on, since the spacer bar assemblies may provide separation between different pipe storage layers.

Preferably, the spacer mechanism is comprised of a plurality of forward spacer bar assemblies for defining a plurality of pipe storage layers and a plurality of rearward spacer bar assemblies for defining the plurality of pipe storage layers. In a particular preferred embodiment, the spacer mechanism is comprised of three forward spacer bar assemblies and three rearward spacer bar assemblies for defining four pipe storage layers in the pipe storage bin.

Each spacer bar assembly is comprised of a spacer bar, wherein the spacer bar is extendible within the pipe storage bin to an extended position in which the spacer bar is above the lower adjacent pipe storage layer and wherein the spacer bar may be withdrawn to a withdrawn position in which the spacer bar is withdrawn from the pipe storage bin. The spacer bar may be extended and withdrawn manually. Preferably, however, the spacer bar assembly provides for automated or semi-automated actuation of the spacer bar.

Preferably the pipe storage bin is comprised of a bin frame and a pipe rack carried by the bin frame, and preferably the pipe rack is vertically reciprocable relative to the bin frame in order to cause the pipe storage layers sequentially to be vertically aligned with the bin dispensing position.

As a result, preferably each spacer bar assembly is adapted so that the spacer bar is supported by the pipe sections in the lower adjacent pipe storage layer when the spacer bar is in the extended position, and preferably the spacer bar is vertically reciprocable with the pipe rack relative to the bin frame when the spacer bar is in the extended position.

Preferably the spacer bar is comprised of a spacer bar pivot axis and preferably the spacer bar is pivotable about the spacer bar pivot axis relative to the bin frame in order to move between the extended position and the withdrawn position.

Preferably the spacer bar assembly is further comprised of a spacer bar actuator for selectively moving the spacer bar between the extended position and the withdrawn position as the pipe rack reciprocates relative to the bin frame. The spacer bar actuator may be comprised of any structure, apparatus or device which is capable of causing the spacer bar to pivot between the extended position and the withdrawn position.

Preferably the spacer bar actuator is comprised of a spacer bar stop for engaging the spacer bar in order to limit the reciprocation of the spacer bar in an upward vertical direction. The spacer bar stop engages the spacer substantially in horizontal alignment with the spacer bar pivot axis so that the spacer bar stop does not interfere with the pivoting of the spacer bar.

Preferably the spacer bar stop is associated with the bin frame and is positioned such that the spacer bar stop engages the spacer bar as the spacer bar reciprocates in the upward vertical direction to a spacer bar stop position at which the upper adjacent pipe storage layer is vertically aligned above the bin dispensing position and the lower adjacent pipe storage layer is vertically aligned below the bin dispensing position. This configuration ensures that the spacer bar is in the extended position as pipe sections are returned to the upper adjacent pipe storage layer and that the spacer bar is in the withdrawn position as pipe sections are removed from the lower adjacent pipe storage layer.

The spacer bar may be actuated to the withdrawn position by pivoting against a pipe section positioned in the lower adjacent pipe storage layer. Preferably, however, the spacer bar actuator is further comprised of a spacer bar pivoting member for engaging the spacer bar to cause the spacer bar to pivot about the spacer bar pivot axis when the spacer bar stop is engaged with the spacer bar. The spacer bar pivoting member is horizontally offset from the spacer bar pivot axis in order to provide a lever arm between the spacer bar pivot axis and the spacer bar pivoting member.

The spacer bar pivoting member is preferably associated with the pipe rack so that the spacer bar pivoting member reciprocates with the pipe rack relative to the bin frame. The spacer bar pivoting member is positioned so that it is horizontally aligned between the spacer bar pivot axis and the pipe section in the lower adjacent pipe storage layer which is closest to the spacer bar pivot axis. Preferably the spacer bar pivoting member is substantially vertically aligned with the spacer bar so that the spacer bar engages the spacer bar stop and the space bar pivoting member substantially simultaneously. Since the spacer bar is preferably supported by the pipe sections stored in the lower adjacent pipe storage layer, the spacer bar pivoting member is therefore preferably also substantially vertically aligned with the top of the lower adjacent pipe storage layer.

In preferred embodiments, the spacer bar pivoting member is comprised of a pivot plate which is comprised of a pivot surface for engaging the spacer bar. Where the apparatus is comprised of a plurality of spacer bar assemblies for defining the plurality of pipe storage layers, a single pivot plate comprising a plurality of pivot surfaces may be used as the spacer bar pivoting member for all of the spacer bar assemblies. The pivot surfaces on the pivot plate are preferably configured so that they are substantially vertically aligned with their respective spacer bars, and thus are also preferably substantially vertically aligned with the top of their respective lower adjacent pipe storage layers.

Where the apparatus is comprised of a plurality of forward spacer bar assemblies and a plurality of rearward spacer bar assemblies, one such pivot plate may be used as the spacer bar pivoting member for the forward spacer bar assemblies and a second such pivot plate may be used as the spacer bar pivoting member for the rearward spacer bar assemblies.

As a result, the pipe storage bin may be configured to store pipe sections having any diameter or combination of diameters by simply adjusting the vertical positions of the spacer bar pivoting members. Where a plurality of spacer bar pivoting members is comprised of a single pivot plate, the diameter or diameters of the pipe sections to be stored by the pipe storage bin may be changed simply by exchanging the pivot plate in order to provide a different configuration of pivot surfaces.

Preferably the spacer bar assembly is further comprised of a spacer bar guideway for retaining and guiding the reciprocation and pivoting of the spacer bar. Preferably the spacer bar guideway is associated with the bin frame. In preferred embodiments the spacer bar stop is located within the spacer bar guideway and the spacer bar pivot axis is contained within the spacer bar guideway when the spacer bar is retained in the spacer bar guideway.

The spacer bar assembly may be further comprised of a latch mechanism for supporting the spacer bar in the spacer bar guideway when the spacer bar is in the withdrawn position, thus preventing the spacer bar from falling within the spacer bar guideway. The latch mechanism is configured so that it permits the spacer bar to reciprocate within the spacer bar guideway when the spacer bar is in the extended position. The latch mechanism may be comprised of any structure, apparatus or device which is capable of achieving the functions of supporting the spacer bar in the withdrawn position and permitting the spacer bar to reciprocate in the extended position.

Preferably the latch mechanism is comprised of a detent which extends within the spacer bar guideway to support the spacer bar when the spacer bar is in the withdrawn position and which substantially retracts from the spacer bar guideway when the spacer bar moves from the withdrawn position to the extended position. Preferably the latch mechanism is further comprised of a detent engagement surface for depressing the detent when the spacer bar moves from the withdrawn position to the extended position. In preferred embodiments spacer bar is comprised of the detent engagement surface.

The pipe transfer device may be comprised of any structure, apparatus or device which is capable of transferring the selected pipe section between the bin dispensing position and the pipe transfer position. Preferably the pipe transfer device is comprised of a relatively simple design which minimizes the complexity of the movements which must be performed by the pipe transfer device.

The pipe transfer position is a position in space at which the selected pipe section is transferred to the pipe handling device. The selected pipe section is preferably in a substantially horizontal orientation when it is at the pipe transfer position. Preferably the pipe transfer position is substantially fixed so that the pipe handling device is always substantially at the same location or position when the pipe sections are transferred to the pipe handling device.

As a result, in such preferred embodiments, the pipe transfer device need only move between the substantially fixed bin dispensing position and the substantially fixed pipe transfer position.

In such circumstances the pipe transfer device is preferably comprised of a pipe transfer arm which is preferably capable of pivoting, extending and retracting in order to transfer the selected pipe section between the bin dispensing position and the pipe transfer position.

Specifically, the pipe transfer arm has an upper end and a lower end, and preferably the pipe transfer arm is pivotable about the lower end to move the selected pipe section between the bin dispensing position and the pipe transfer position. In addition, the pipe transfer arm has a length and preferably the pipe transfer arm is extendible and retractable in order to adjust the length of the pipe transfer arm in order to move the selected pipe section between the bin dispensing position and the pipe transfer position. The pipe transfer arm is preferably comprised of a pipe supporting surface located at the upper end, for supporting the selected pipe section as it is transferred between the bin dispensing position and the pipe transfer position.

The pipe handling device may be comprised of any structure, apparatus or device which is capable of moving the selected pipe section between the pipe transfer position and the drilling head interface position. As with the pipe transfer device, preferably the pipe handling device is comprised of a relatively simple design which minimizes the complexity of the movements which must be performed by the pipe handling device.

Preferably the pipe handling device is comprised of a pipe clamping mechanism for holding the selected pipe section as it is moved between the pipe transfer position and the drilling head interface position.

Since the apparatus is intended to be capable of handling pipe sections having different diameters, the apparatus is preferably further comprised of a pipe diameter sensing device for providing an indication of a diameter of the selected pipe section before it is clamped by the pipe clamping mechanism, thus providing an opportunity to adjust the pipe clamping mechanism and/or the pipe transfer device and/or the pipe handling device either manually, semi-automatically or automatically to accommodate the diameter of the selected pipe section.

In preferred embodiments, the pipe transfer device is operatively connected with the pipe diameter sensing device and the pipe transfer device is configured to automatically position the selected pipe section in response to the indication from the pipe diameter sensing device so that the selected pipe section is held substantially concentrically by the pipe clamping mechanism when it is clamped at the pipe transfer position by the pipe clamping mechanism. As a result, in preferred embodiments the pipe transfer position is a position at which the selected pipe section may be transferred to the pipe handling device so that the selected pipe section is held substantially concentrically by the pipe clamping mechanism.

In preferred embodiments, the selected pipe section is positioned by the pipe transfer device in response to the indication from the pipe diameter sensing device by adjusting the length of the pipe transfer arm.

The drilling head interface position is a position in space to which the selected pipe section is moved by the pipe handling device. As a result, the drilling head interface position may be any desired position. In preferred embodiments where the apparatus is used with a drilling head, the drilling head interface position is a position where the selected pipe section may interface with or be used by the drilling head. In such preferred embodiments, the drilling head interface position may more particularly be a position which facilitates connection of the selected pipe section to the drilling head or disconnection of the selected pipe section from the drilling head.

In preferred embodiments the pipe transfer position is substantially fixed, and the drilling head interface position is preferably also substantially fixed. As a result, preferably the pipe handling device need only move between the substantially fixed pipe transfer position and the drilling head interface position.

In such circumstances the pipe handling device is preferably comprised of a pipe handling arm which is capable of pivoting in order to transfer the selected pipe section between the pipe transfer position and the drilling head interface position. More specifically, the pipe handling arm preferably has an upper end and a lower end, and preferably the pipe handling arm is pivotable about the lower end to move the selected pipe section between the pipe transfer position and the drilling head interface position.

Preferably the selected pipe section has a substantially horizontal orientation when it is at the pipe transfer position and has a substantially vertical orientation when it is at the drilling head interface position, which is achievable by the pipe handling arm if it is required to pivot substantially ninety degrees.

If, however, the pipe handling arm is required to pivot more or less than ninety degrees, the pipe handling arm is preferably further comprised of a structure, apparatus or device for providing the substantially horizontal orientation and the substantially vertical orientation of the selected pipe section at the pipe transfer position and the drilling head interface position respectively.

In preferred embodiments, the apparatus is positioned so that the pipe handling arm pivots about a point which is horizontally offset from the drilling head interface position, thus avoiding obstruction of the drilling head by the pipe handling arm. As a result, in the preferred embodiments the pipe handling arm is required to pivot greater than ninety degrees in order to move the selected pipe section to the drilling head interface position.

In such circumstances, the pipe handling arm is preferably comprised of a primary pipe handling arm and a secondary pipe handling arm. The primary pipe handling arm has an upper end and a lower end and is pivotable about the lower end. The secondary pipe handling arm is pivotably connected with the primary pipe handling arm, preferably with the upper end of the primary pipe handling arm. The pipe clamping mechanism is associated with the secondary pipe handling arm.

The primary pipe handling arm and the secondary pipe handling arm are preferably configured so that as the primary pipe handling arm pivots about its lower end, the secondary pipe handling arm pivots so that the selected pipe section is substantially in a horizontal orientation at the pipe transfer position and so that the selected pipe section is at a substantially vertical orientation at the drilling head interface position.

The drilling head interface position may be any position in space which enables the selected pipe section to be utilized by the drilling head. Preferably the drilling head interface position is a position which enables the selected pipe section to be attached to or removed from the drilling head. In preferred embodiments, the drilling head interface position is substantially vertically aligned with the drilling head so that the drilling head may move substantially vertically to connect with the selected pipe section.

The pipe handling arm may in some embodiments be capable of moving the selected pipe section longitudinally when the selected pipe section is held by the pipe handling arm, thus assisting in connecting the selected pipe section with the drilling head. This longitudinal movement may be accomplished by extending or retracting the pipe handling arm, by moving the pipe clamping mechanism, or by any other manipulation of the pipe handling arm which is capable of causing longitudinal movement of the selected pipe section.

The drilling head may be comprised of any structure, apparatus or device which is capable of imparting movement to the drill string to facilitate drilling. For example, the drilling head may be comprised of a bottom drive drilling head or a top drive drilling head. The drilling head may be supported by any suitable structure, apparatus or device.

In some embodiments the drilling head is comprised of a top drive drilling head which also supports the drill string during drilling. In such embodiments, the drilling head may be supported by any structure, apparatus or device which is capable of supporting both the weight of the drilling head and the weight of a drill string connected with the drilling head and which facilitates some vertical reciprocation of the drilling head. For example, in such embodiments the drilling head may be supported by a frame, and the frame may be comprised of one or more hydraulic cylinders for causing the drilling head to reciprocate.

Alternatively, in such embodiments the drilling head is preferably associated with a derrick such that the drilling head is supported by the derrick and the drilling head supports the drill string. The derrick preferably defines an interior derrick space and preferably the drilling head and the drilling head interface position are located substantially within the interior derrick space.

As a result, preferably the derrick defines an open side and preferably the selected pipe section is passed through the open side of the derrick to the interior derrick space as the selected pipe section moves from the pipe transfer position and the drilling head interface position.

The apparatus may be further comprised of the drilling head and/or the derrick or the drilling head and/or the derrick may be separate from the apparatus. In any case, the apparatus is preferably positioned on a chassis or frame to maintain the components of the apparatus in a desired configuration. The chassis or frame may be adapted to be carried on or mounted on a trailer or a self-propelled vehicle. The self-propelled vehicle may be a truck.

Alternatively, some or all of the components of the apparatus, including the pipe storage bin, the pipe transfer device and the pipe handling device, may be separately provided to and configured at the drilling site.

Preferably the apparatus is comprised of the drilling head and the derrick and preferably the apparatus is mounted on a truck or other self-propelled vehicle.

The apparatus of the invention may be used to transfer pipe sections either from one or more pipe storage bins to the drilling head interface position or from the drilling head interface position to one or more pipe storage bins. In order to transfer pipe sections from the drilling head interface position to one or more pipe storage bins, the operations of the apparatus as set out above may be reversed.

Preferably the method of the invention is performed using the apparatus of the invention. The method of the invention may, however, be performed using other apparatus which are capable of performing the steps of the method of the invention. The method is performed using apparatus comprising a pipe storage bin, a pipe transfer device and a pipe handling device. The method may also be performed with apparatus further comprising a drilling head. The drilling head may be associated with a derrick so that the apparatus may be further comprised of the derrick.

In the method, the step of presenting the selected pipe section to the bin dispensing position is preferably comprised of pivoting the pipe storage bin about the bin pivot axis. Preferably the bin pivot axis substantially coincides with the bin dispensing position.

The pipe transfer device is preferably pivotable about a lower end of the pipe transfer device and the pipe transfer device preferably has a length which is adjustable.

In the method, the selected pipe section is preferably moved between the bin dispensing position and the pipe transfer position by pivoting the pipe transfer device and/or adjusting the length of the pipe transfer device. More preferably the selected pipe section is moved between the bin dispensing position and the pipe transfer position by a combination of pivoting the pipe transfer device and adjusting the length of the pipe transfer device.

As a result, the step of moving the pipe transfer device to the bin dispensing position is preferably comprised of pivoting the pipe transfer device so that the pipe transfer device is radially aligned with the bin dispensing position and is preferably further comprised of extending the length of the pipe transfer device so that the pipe transfer device engages the selected pipe section at the bin dispensing position.

The step of transferring the selected pipe section from the bin dispensing position to the pipe transfer position is preferably comprised of pivoting the pipe transfer device so that the pipe transfer device is radially aligned with the pipe transfer position, is preferably further comprised of extending the length of the pipe transfer device so that the selected pipe section is unobstructed by the pipe storage bin as the pipe transfer device pivots toward the pipe transfer position, and is preferably further comprised of reducing the length of the pipe transfer device so that the selected pipe section is lowered to the pipe transfer position.

In other words, the pipe transfer device preferably performs a sequence of very simple movements in order to transfer the selected pipe section between the bin dispensing position and the pipe transfer position.

The step of engaging the selected pipe section with the pipe handling device at the pipe transfer position is preferably comprised of clamping the selected pipe section with a pipe clamping mechanism so that the selected pipe section is held by the pipe clamping mechanism.

Preferably the step of transferring the selected pipe section from the bin dispensing position to the pipe transfer position is further comprised of sensing an indication of a diameter of the selected pipe section and positioning the selected pipe section in response to the indication of the diameter of the selected pipe section so that the selected pipe section is held substantially concentrically by the pipe clamping mechanism when it is clamped at the pipe transfer position by the pipe clamping mechanism. Preferably the selected pipe section is positioned automatically in response to the indication of the diameter of the selected pipe section, but the selected pipe section may also be positioned manually or semi-automatically.

In preferred embodiments, the selected pipe section is positioned for clamping by the pipe clamping mechanism by controlling the extent to which the length of the pipe transfer device is reduced as the selected pipe section is lowered to the pipe transfer position such that the axis of the selected pipe section substantially coincides with the axis of the pipe clamping mechanism.

The pipe handling device is preferably pivotable about a lower end of the pipe transfer device.

In the method, the selected pipe section is preferably moved between the pipe transfer position and the drilling head interface position substantially by pivoting the pipe handling device.

More preferably, the pipe handling device is comprised of a pipe handling arm and the selected pipe section is preferably moved between the pipe transfer position and the drilling head interface position substantially by pivoting the pipe handling arm.

Even more preferably, the pipe handling arm is comprised of a primary pipe handling arm and a secondary pipe handling arm and the selected pipe section is preferably moved between the pipe transfer position and the drilling head interface position substantially by pivoting both the primary pipe handling arm and the secondary pipe handling arm. The selected pipe section is preferably held by the secondary pipe handling arm.

More specifically, the primary pipe handling arm is preferably pivotable about a lower end of the primary pipe handling arm and the secondary pipe handling arm is preferably pivotable about an upper end of the primary pipe handling arm. This arrangement facilitates moving the selected pipe section between a substantially horizontal orientation at the pipe transfer position to a substantially vertical orientation at the drilling head interface position if the primary pipe handling arm does not pivot ninety degrees. Preferably the lower end of the primary pipe handling arm is horizontally offset from the drilling head interface position so that the primary pipe handling arm must pivot more than ninety degrees in order to move the selected pipe section to the drilling head interface position.

As a result, the step of moving the selected pipe section from the pipe transfer position to the drilling head interface position is preferably comprised of pivoting the primary pipe handling arm greater than ninety degrees and pivoting the secondary pipe handling arm so that the selected pipe section is substantially in a horizontal orientation at the pipe transfer position and in a substantially vertical orientation at the drilling head interface position.

The drilling head interface position is associated with a drilling head. The drilling head may be associated with a derrick. Preferably the derrick defines an interior derrick space and preferably the drilling head and the drilling head interface position are both located substantially within the interior derrick space. Alternatively, the drilling head and the drilling head interface position may be located adjacent to the derrick. Preferably the drilling head interface position is substantially vertically aligned with the drilling head.

Preferably the derrick also defines an open side. As a result, in the method the step of moving the selected pipe section from the pipe transfer position to the drilling head interface position may be comprised of passing the selected pipe section through the open side of the derrick to the interior derrick space.

The method of the invention may be used to transfer pipe sections having varying diameters. As a result, the pipe storage bin may store pipe sections which all have the same or similar diameter, or the pipe storage bin may store pipe sections having different diameters. Preferably the pipe storage bin stores layers of pipe sections and preferably all of the pipe sections in a particular layer have the same diameter or a similar diameter. More preferably, all of the pipe sections in the pipe storage bin have the same diameter or a similar diameter.

As a result, the apparatus used to perform the method may be further comprised of a second pipe storage bin. The second pipe storage bin may store pipe sections having the same diameter as or a different diameter from the pipe sections stored in the pipe storage bin. The method may therefore be further comprised of the following steps:

(f) presenting a second pipe section to a substantially fixed second bin dispensing position in a second pipe storage bin, wherein the selected pipe section and the second pipe section have different diameters;

(g) moving the pipe transfer device to the second bin dispensing position in order to engage the second pipe section with the pipe transfer device at the second bin dispensing position;

(h) transferring the second pipe section with the pipe transfer device from the second bin dispensing position to the pipe transfer position;

(i) engaging the second pipe section with the pipe handling device at the pipe transfer position; and (j) moving the second pipe section with the pipe handling device from the pipe transfer position to the drilling head interface position.

As a result, the step of engaging the selected pipe section with the pipe handling device at the pipe transfer position may therefore be comprised of clamping the selected pipe section with a pipe clamping mechanism so that the selected pipe section is held by the pipe clamping mechanism and the step of engaging the second pipe section with the pipe handling device at the pipe transfer position may be comprised of clamping the second pipe section with the pipe clamping mechanism so that the second pipe section is held by the pipe clamping mechanism.

In addition, the step of transferring the selected pipe section from the bin dispensing position to the pipe transfer position may be comprised of sensing an indication of the diameter of the selected pipe section and automatically positioning the selected pipe section in response to the indication of the diameter of the selected pipe section so that the selected pipe section is held substantially concentrically by the pipe clamping mechanism when the selected pipe section is clamped at the pipe transfer position by the pipe clamping mechanism, and the step of transferring the second pipe section from the second bin dispensing position to the pipe transfer position may be comprised of sensing an indication of the diameter of the second pipe section and automatically positioning the second pipe section in response to the indication of the diameter of the second pipe section so that the second pipe section is held substantially concentrically by the pipe clamping mechanism when the second pipe section is clamped at the pipe transfer position by the pipe clamping mechanism.

The method of the invention may be used to transfer pipe sections either from one or more pipe storage bins to the drilling head interface position or from the drilling head interface position to one or more pipe storage bins. In order to transfer pipe sections from the drilling head interface position to one or more pipe storage bins, the steps of the method as set out above may be reversed.

BRIEF DESCRIPTION OF DRAWINGS

Embodiments of the invention will now be described with reference to the accompanying drawings, in which:

FIG. 11 is a transverse cross-section view of the preferred embodiment of the apparatus of the invention, taken along section line X-X of FIG. 4, showing the third uppermost pipe storage layer of the first pipe storage bin vertically aligned with the bin dispensing position of the first pipe storage bin and showing the pipe transfer device radially aligned with the bin dispensing position of the first pipe storage bin.

FIG. 12 is a transverse cross-section view of the preferred embodiment of the apparatus of the invention, taken along section line X-X of FIG. 4, showing the fourth uppermost pipe storage layer of the first pipe storage bin vertically aligned with the bin dispensing position of the first pipe storage bin and showing the pipe transfer device radially aligned with the bin dispensing position of the first pipe storage bin.

DETAILED DESCRIPTION

The present invention is an apparatus and method for handling pipe sections, preferably for use in association with a drilling head, and preferably for drilling purposes.

The apparatus and the drilling head may be used to drill any type of borehole, which borehole may be used for any purpose. In the preferred embodiment the apparatus, the drilling head and a derrick are used to drill boreholes for use in a geothermal heat exchange system. However, the apparatus and method may be used in connection with drilling boreholes for other purposes such as for mineral exploration, for geotechnical, environmental or geo-environmental engineering purposes, for use as water wells, or in connection with other similar drilling requirements.

Figure 1:
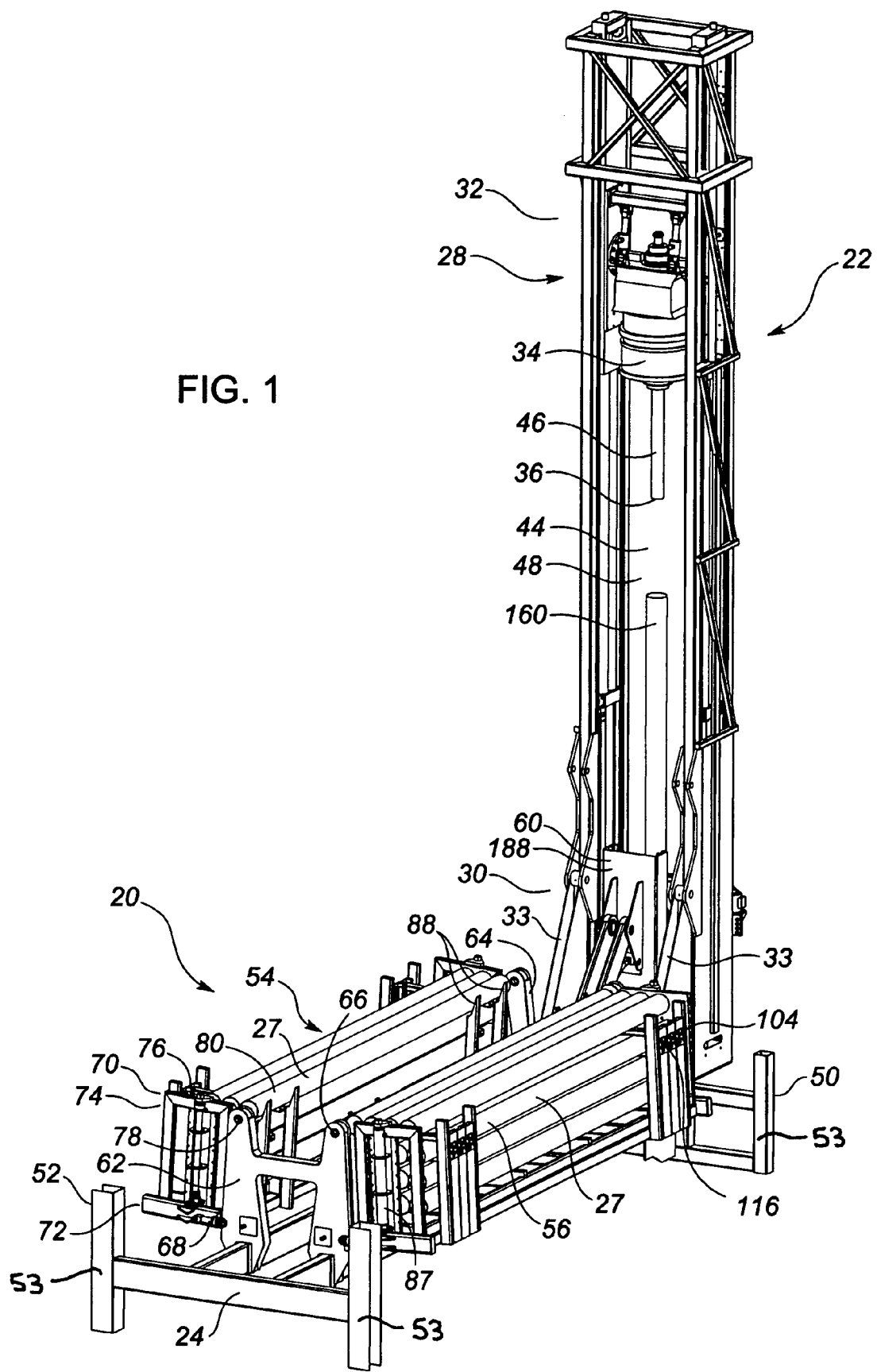
FIG. 1 is a pictorial view of the preferred embodiment of the apparatus of the invention, a drilling head and a derrick mounted on a chassis, looking toward the rearward end of the chassis, and showing a selected pipe section positioned at the drilling head interface position.
Figure 2:
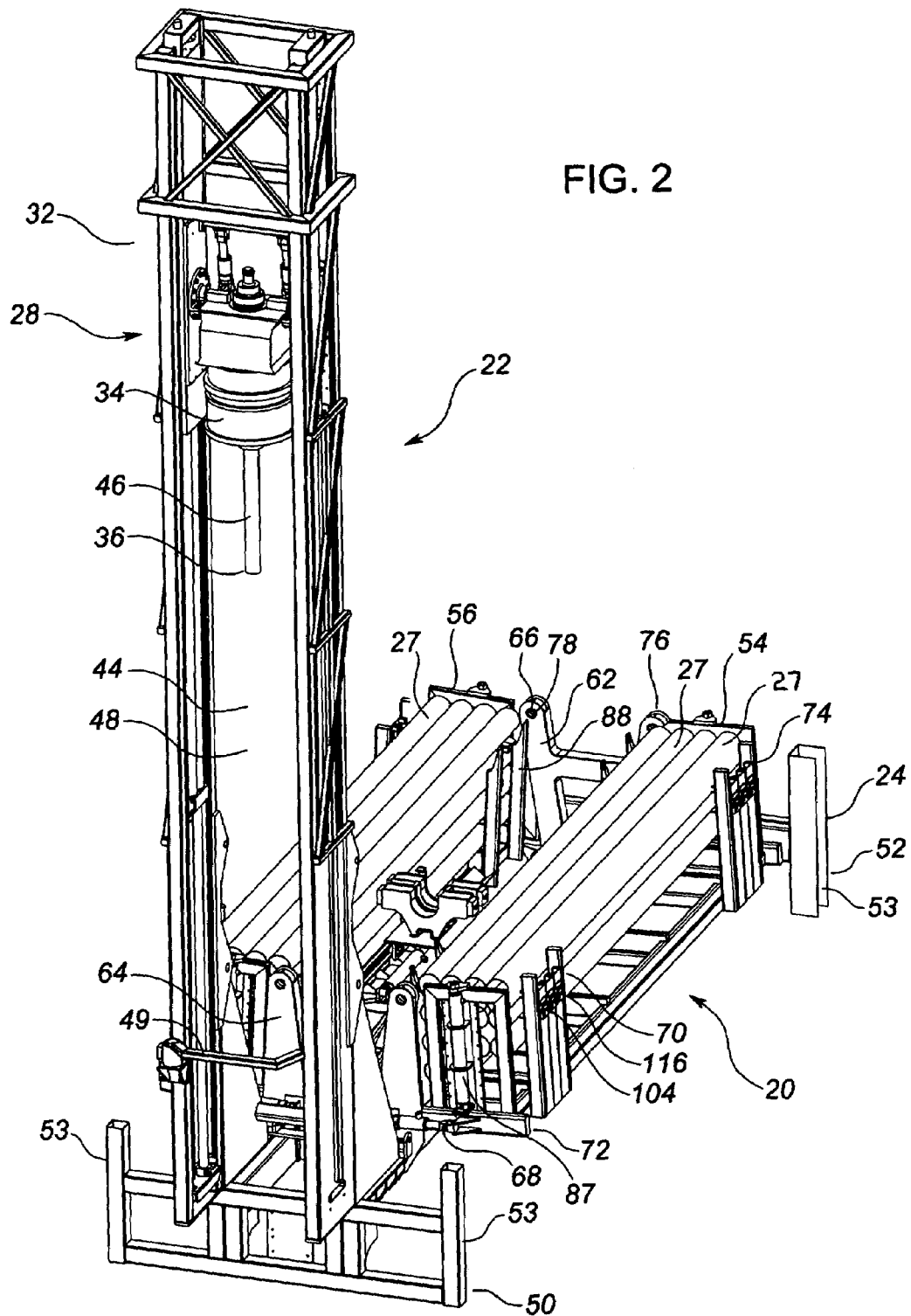
FIG. 2 is a pictorial view of the preferred embodiment of the apparatus of the invention, a drilling head and a derrick mounted on a chassis, looking toward the forward end of the chassis.
Figure 3:
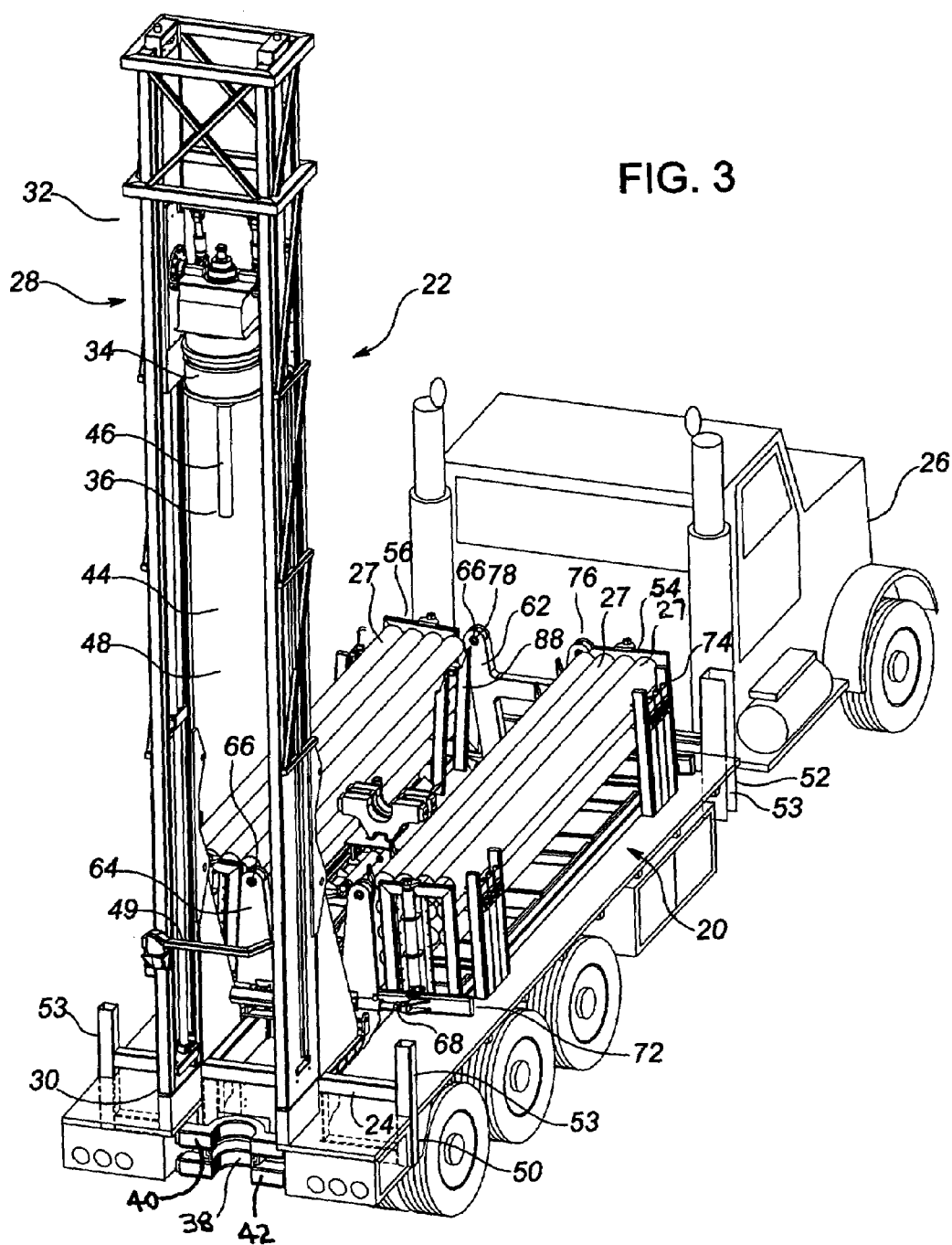
FIG. 3 is a pictorial view of the preferred embodiment of the apparatus of the invention, a drilling head and a derrick mounted on a chassis, depicting the chassis is mounted on a truck.
Figure 4:
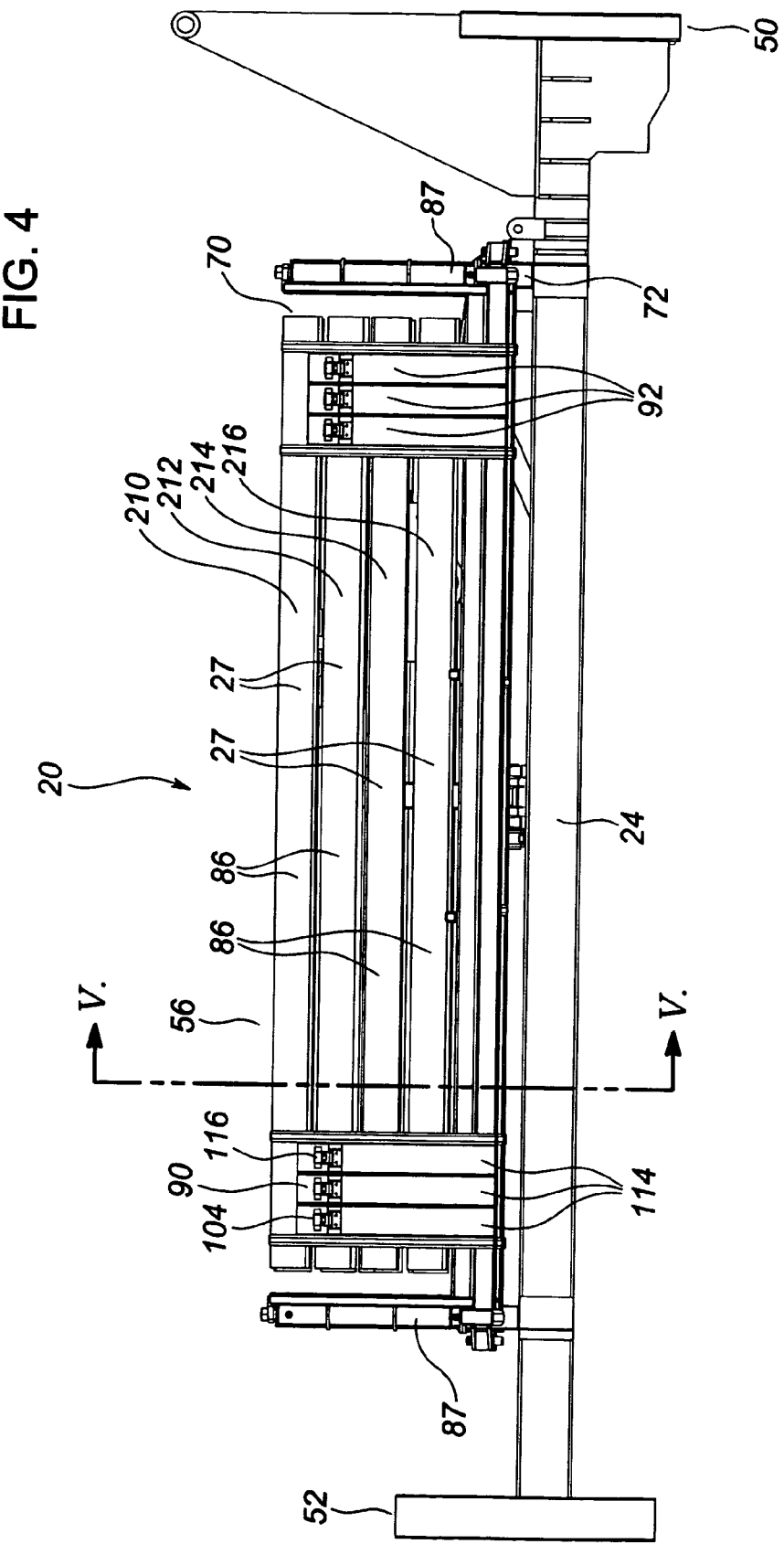
FIG. 4 is a side view of the preferred embodiment of the apparatus of the invention mounted on a chassis.

Referring to FIGS. 1-3, in the preferred embodiment the apparatus (20) and a derrick (22) are configured together on a chassis (24). The chassis (24) is in turn mounted on a truck (26) so that the apparatus (20) and the derrick (22) are mobile. The apparatus (20) is used to transfer pipe sections (27) between the apparatus (20) and the derrick (22).

In the preferred embodiment, the pipe sections (27) are comprised of substantially cylindrical pipes or rods which are intended to be connected together to form a drill string.

The derrick (22) is comprised of a mast (28). The mast (28) has a lower end (30) which is pivotably connected with the chassis (24) so that the mast (28) may pivot relative to the chassis (24) between a lowered position (not shown) and a raised position (32). The pivoting of the mast (28) is effected by actuating two mast cylinders (33) which are connected between the mast (28) and the chassis (24).

The mast (28) is placed in the lowered position during transport and is placed in the raised position (32) during use of the derrick (22). The mast (28) has a height which is greater than the length of the pipe sections which are to be used in association with the derrick (22).

In the preferred embodiment a top drive drilling head (34) is suspended from the mast (28) of the derrick (22). The primary functions of the drilling head (34) are to support a drill string (not shown) such as a drill string and to impart drilling movements to the drill string, such as rotation, reciprocation, oscillation or vibration. The drilling head (34) is capable of reciprocating vertically relative to the mast (28) a distance which is at least equal to the length of the pipe sections which are to be used in association with the derrick (22).

In the preferred embodiment the drilling head (34) is a sonic drilling head of the type manufactured by Sonic Drill Corporation of Bellingham, Wash. USA and Surrey, British Columbia, Canada. A sonic drilling head is a rotary-vibratory drill which both rotates the drill string and oscillates the drill string at high frequency.

The drilling head (34) includes a threaded connector (36) by which a threaded pipe section may be connected with the drilling head. The threaded connector (36) may be a pin connection or a box connection. The drill string is therefore supported by the drilling head (34).

The derrick (22) is further comprised of a breakout clamp assembly (38) which includes an upper breakout clamp (40) and a lower breakout clamp (42). The breakout clamp assembly (38) is substantially aligned with the threaded box connection (36) on the drilling head (34). The breakout clamp assembly (38) may be attached to the derrick (22) or the chassis (24). However, in the preferred embodiment the breakout clamp assembly (38) is attached to the truck (26).

The breakout clamp assembly (36) is used to support the drill string in the borehole (not shown) while the pipe sections (27) are being removed from the drill string as the drill string is being removed from the borehole.

The upper breakout clamp (40) is also capable of limited rotation and the application of significant torque. As a result, the breakout clamp assembly (38) is used to "make" or "break" connections between pipe sections (27) which are being added to or removed from the drill string respectively, since the lower breakout clamp (42) will hold the drill string as the upper breakout clamp (40) applies torque to and rotates the pipe section (44) which is being added to or removed from the drill string.

Referring to FIG. 1, the derrick (22) defines an interior derrick space (44). In the preferred embodiment, the drilling head (34) is located substantially within the interior derrick space (44).

In addition, the threaded box connection (36) on the drilling head (34) and the breakout clamp assembly (38) define a pipe section alignment axis (46), which coincides with the axis of a pipe section (27) which is being held by both the threaded box connection (36) and the breakout clamp assembly (38). The pipe section alignment axis (46) is located within the interior derrick space (44).

The derrick (22) further defines an open side (48). The open side (48) of the derrick enables pipe sections (27) to be presented to or removed from the pipe section alignment axis (46). Referring to FIG. 1, the open side (48) of the derrick (22) faces the apparatus (20).

In the preferred embodiment, the side of the derrick (22) opposite the open side (48) is also substantially "open". As a result, in the preferred embodiment the derrick (22) also includes a safety arm (49) located on the side of the derrick (22) opposite the open side (48). The safety arm (49) prevents pipe sections (27) from falling through the derrick (22) if they become separated from the drill string or the drilling head (34).

Referring to FIGS. 1-3, in the preferred embodiment the derrick (22) is located toward a rearward end (50) of the chassis (24) and the apparatus (20) is located toward a forward end (52) of the chassis. Two jack pockets (53) are located at the rearward end (50) of the chassis (24) and two jack pockets (53) are located at the forward end (52) of the chassis (24). The jack pockets (53) are adapted to house jacks (not shown) which may be deployed at the drilling site in order to stabilize, level and/or align the apparatus (20), the derrick (22) and the truck (26).

Referring to FIGS. 1-3 and FIGS. 5-12, the apparatus (20) is comprised of a first pipe storage bin (54), a second pipe storage bin (56), a pipe transfer device (58) and a pipe handling device (60).

The first pipe storage bin (54) and the second pipe storage bin (56) are mounted on the chassis (24) such that the pipe transfer device (58) and the pipe handling device (60) are between the pipe storage bins (54,56). The pipe storage bins (54,56) are each for storing a plurality of pipe sections (27) and are substantially identical. As a result, only the first pipe storage bin (54) will be described in detail, and reference numbers described with relation to the first pipe storage bin (54) will apply also to the second pipe storage bin (56), except where otherwise specifically noted.

Referring to FIG. 1 and FIG. 2, the first pipe storage bin (54) is mounted on the chassis (24) using a forward bin stanchion (62) and a rearward bin stanchion (64). Each of the bin stanchions (62,64) includes an upper pivot connection (66) with the first pipe storage bin (54) so that the first pipe storage bin (54) is pivotable about the pivot connections (66). Pivoting of the first pipe storage bin (54) is effected by actuating two bin pivoting cylinders (68) which are connected between the bin stanchions (62,64) and the first pipe storage bin (54).

Referring to FIGS. 5-12, the first pipe storage bin (54) has an upper end (70), a lower end (72), an outboard side (74) and an inboard side (76). The pipe transfer device (58) and the pipe handling device (60) are adjacent to the inboard side (76) of the first pipe storage bin (54). The first pipe storage bin (54) has a bin pivot axis (78) which is defined by the upper pivot connections (66). The upper pivot connections (66) are located substantially at the upper end (70) and substantially at the inboard side (76) of the first pipe storage bin (54).

The first pipe storage bin (54) defines a bin dispensing position (80) which substantially coincides with the bin pivot axis (78). As a result, the bin dispensing position (80) is substantially fixed as the first pipe storage bin (54) pivots. The pipe sections (27) are stored in the first pipe storage bin (54) in a substantially horizontal pipe orientation and the bin pivot axis (78) is substantially parallel with the pipe orientation.

In order to remove pipe sections (27) from the first pipe storage bin (54), the first pipe storage bin (54) is pivoted by extending the bin pivoting cylinders (68) so that the first pipe storage bin (54) leans toward the inboard side (76) and the pipe sections (27) are removed from the bin dispensing position (80).

In order to deliver pipe sections (27) to the first pipe storage bin (54), the first pipe storage bin (54) is pivoted by retracting the bin pivoting cylinders (68) so that the first pipe storage bin (54) leans toward the outboard side (76) and the pipe sections (27) are deposited at the bin dispensing position (80).

In the preferred embodiment the first pipe storage bin (54) is comprised of a bin frame (82) and a pipe rack (84) carried by the bin frame (82). The pipe rack (84) is capable of providing a plurality of pipe storage layers (86). The pipe rack (84) is vertically reciprocable relative to the bin frame (82) in order to cause the pipe storage layers (86) sequentially to be vertically aligned with the bin dispensing position (80). Reciprocation of the pipe rack (84) is effected by actuating two rack reciprocating cylinders (87) which are located adjacent to the bin stanchions (62,64) and are connected between the bin frame (82) and the pipe rack (84).

The bin frame (82) includes a plurality of bin frame retainers (88) along the outboard side (74) and the inboard side (76) of the first pipe storage bin (54) for preventing the pipe sections (27) from rolling out of the first pipe storage bin (54) as the first pipe storage bin (54) pivots.

Referring to FIGS. 5-12 and FIGS. 13-16, the pipe storage layers (86) are defined by a spacer mechanism (90). The spacer mechanism (90) is comprised of a plurality of spacer bar assemblies (92). Each spacer bar assembly (92) provides a separation between two adjacent pipe storage layers (86) comprising an upper adjacent pipe storage layer (94) and a lower adjacent pipe storage layer (96).

The first pipe storage bin (54) may provide any number of pipe storage layers (86). In the preferred embodiment, the first pipe storage bin (54) provides four pipe storage layers (86). The four pipe storage layers (86) are provided by three forward spacer bar assemblies (92) located toward the forward end (52) of the chassis (24) and three rearward spacer bar assemblies (92) located toward the rearward end (50) of the chassis (24). Each of the spacer bar assemblies (92) is substantially identical.

Referring to FIGS. 5-12, each of the spacer bar assemblies (92) is comprised of a spacer bar (98). The spacer bar (98) is extendible within the pipe rack (84) to an extended position in which the spacer bar (98) is supported by the pipe sections (27) in the lower adjacent pipe storage layer (96) so that it is above the lower adjacent pipe storage layer (96).

Referring to FIGS. 13-16, the spacer bar (98) has a spacer bar pivot axis (100) and is pivotable about the spacer bar pivot axis (100) in order to move between the extended position and a withdrawn position in which the spacer bar (98) is withdrawn from the pipe rack (84).

As shown in FIGS. 13-16, the spacer bar (98) is vertically reciprocable relative to the bin frame (82) when the spacer bar (98) is in the extended position, but the spacer bar (98) is prevented from reciprocating when it is in the withdrawn position.

Each of the spacer bar assemblies (92) is further comprised of a spacer bar actuator (102) for selectively moving the spacer bar (98) between the extended position and the withdrawn position as the spacer bar (98) reciprocates relative to the bin frame (82).

In the preferred embodiment as depicted in FIGS. 13-16, the spacer bar actuator (102) is comprised of a spacer bar stop (104) for engaging the spacer bar (98) in order to limit the reciprocation of the spacer bar (98) in an upward vertical direction. The spacer bar stop (104) engages the spacer bar

(98) substantially in horizontal alignment with the spacer bar pivot axis (100) so that the spacer bar stop (104) does not interfere with the pivoting of the spacer bar (98).

The spacer bar stop (104) is associated with the bin frame (82) and is positioned such that the spacer bar stop (104) engages the spacer bar (98) as the spacer bar (98) reciprocates in the upward vertical direction to a spacer bar stop position (106) at which the upper adjacent pipe storage layer (94) provided by the spacer bar (98) is vertically aligned above the bin dispensing position (80) and the lower adjacent pipe storage layer (96) provided by the spacer bar (98) is vertically aligned below the bin dispensing position (80).

In order to pivot, the spacer bar (98) requires a force to be applied which is offset from the spacer bar pivot axis (100). This force may be applied by the pipe sections (27) stored in the lower adjacent pipe storage layer (96) as the pipe rack (84) moves vertically upward relative to the bin frame (82) after the spacer bar (98) engages the spacer bar stop (104). However, in the preferred embodiment, the spacer bar actuator (102) is further comprised of a spacer bar pivoting member (108) which is associated with the pipe rack (84) and which is horizontally offset from the spacer bar pivot axis (100).

Figure 23:
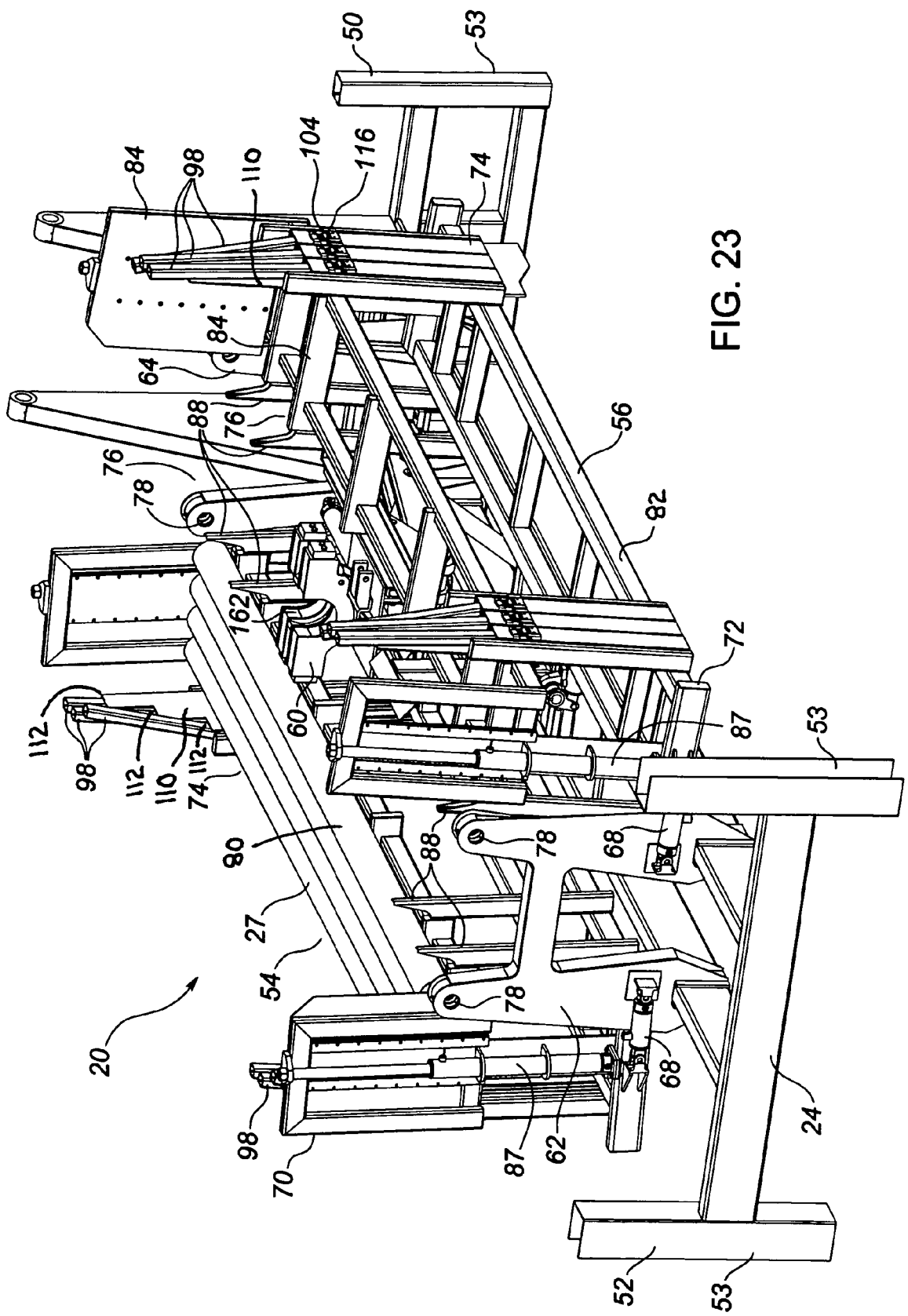
FIG. 23 is a pictorial view of the preferred embodiment of the apparatus of the invention, depicting the first and second pipe storage bins pivoted toward their outboard sides following delivery of a single layer of pipe sections to the first pipe storage bin.

As shown in FIGS. 13-16 and in FIG. 23 the spacer bar pivoting member (108) reciprocates with the pipe rack (84) relative to the bin frame (82) and is substantially vertically aligned with the spacer bar (98) when the spacer bar (98) is in the extended position.

Referring to FIG. 23, in the preferred embodiment, the spacer bar pivoting member (108) for all of the forward spacer bar assemblies (92) is comprised of a single pivot plate (110) which includes a plurality of pivot surfaces (112) for engaging the spacer bars (98), each corresponding to one of the forward spacer bar assemblies (92). Similarly, the spacer bar pivoting member (108) for each of the rearward spacer bar assemblies (92) is comprised of a single pivot plate (110) which includes a plurality of pivot surfaces (112) for engaging the spacer bars (98), each corresponding to one of the rearward spacer assemblies (92).

Since the spacer bars (98) of the various spacer bar assemblies (92) are supported on pipe sections (27), it can be seen that the first pipe storage bin (54) can be configured to store pipe sections (27) having one or more particular diameters simply by configuring the pivot surfaces (112) on the pivot plates (110) to reflect the diameter or diameters of the pipe sections (27) which are to be stored by the first pipe storage bin (54).

In the preferred embodiment, the first pipe storage bin (54) and the second pipe storage bin (56) are each configured to store pipe sections (27) which all have identical or substantially similar diameters. The diameters of the pipe sections (27) stored by the second pipe storage bin (56) may be the same as those stored by the first pipe storage bin (54) or may be different.

Referring to FIGS. 1-3 and FIGS. 13-16, in the preferred embodiment each of the spacer bar assemblies (92) is further comprised of a spacer bar guideway (114) associated with the bin frame (82) for retaining and guiding the spacer bar (98). The spacer bar (98) is retained in the spacer bar guideway (114) such that the spacer bar pivot axis (100) is contained in the spacer bar guideway, and the spacer bar stop (104) is also located in the spacer bar guideway (114).

In the preferred embodiment, each of the spacer bar assemblies (92) is further comprised of a latch mechanism (116) for supporting the spacer bar (98) in the spacer bar guideway (114) when the spacer bar (98) is in the withdrawn position. The latch mechanism (116) is configured so that it permits the spacer bar (98) to reciprocate within the spacer bar guideway (114) when the spacer bar (98) is in the extended position, but prevents the spacer bar (98) from falling down within the spacer bar guideway (114) when the spacer bar (98) is in the withdrawn position.

The latch mechanism (116) is comprised of a detent (118) which extends into the spacer bar guideway (114) to support the spacer bar (98) when the spacer bar (98) is in the withdrawn position and which substantially retracts from the spacer bar guideway (114) when the spacer bar (98) moves from the withdrawn position to the extended position. The latch mechanism (116) is further comprised of a detent engagement surface (120) on the spacer bar (98) which depresses the detent (118) when the spacer bar (98) moves from the withdrawn position to the extended position.

The detent (118) and the detent engagement surface (120) may be configured so that the detent engagement surface (120) depresses the detent (118) sufficiently to enable the spacer bar (98) to move past the detent (118) as the spacer bar (98) moves from the withdrawn position to the extended position. Alternatively, the detent engagement surface (120) may partially depress the detent (118) and the subsequent addition of pipe sections (27) to the upper adjacent pipe storage layer (94) may provide weight to further depress the detent (118) so that the spacer bar (98) may move past the detent (118).

Referring to FIGS. 5-12, the purpose of the pipe transfer device (58) is to individually transfer a selected pipe section (27) between the two bin dispensing positions (80) in the pipe storage bins (54,56) and a pipe transfer position (140) defined by a position of the pipe handling device (60). As described in detail below, the pipe transfer position (140) is a position of the pipe handling device (60) at which the pipe handling device (60) either receives the selected pipe section (27) from the pipe transfer device (58) or provides the selected pipe section (27) to the pipe transfer device (58), and is substantially fixed. In the preferred embodiment, the selected pipe section (27) is at a substantially horizontal orientation when it is at the pipe transfer position (140).

Referring to FIGS. 5-12 and FIGS. 20-22, the pipe transfer device (58) is comprised of a pipe transfer arm (142). The pipe transfer arm (142) has an upper end (144) and a lower end (146). The lower end (146) of the pipe transfer arm (142) is connected with the chassis (24) so that the pipe transfer arm (142) is pivotable about the lower end (146). The pipe transfer arm (142) is also extendible and retractable in order to adjust the length of the pipe transfer arm (142).

Pivoting of the pipe transfer arm (142) is effected by actuating a rotary drive mechanism (not shown) which is connected between the pipe transfer arm (142) and the chassis (24). Extension and retraction of the pipe transfer arm (142) is effected by actuating an extension cylinder (not shown) which is located within the pipe transfer arm (142).

The pipe transfer arm (142) is comprised of a pipe supporting surface (148) located at the upper end (144) of the pipe transfer arm (142). The pipe supporting surface (148) supports a selected pipe section (27) as it is transferred between one of the bin dispensing positions (80) and the pipe transfer position (140).

The pipe transfer arm (142) is therefore required only to perform a combination of relatively simple movements in order to move the selected pipe section (27) between the substantially fixed bin dispensing positions (80) and the substantially fixed pipe transfer position (140).

The purpose of the pipe handling device (60) is to individually move the selected pipe section (27) between the substantially fixed pipe transfer position (140) and a drilling head interface position (160).

Preferably the drilling head interface position (160) is substantially fixed in order to simplify the required movements of the pipe handling device (60). In the preferred embodiment, the drilling head interface position (160) substantially coincides with the pipe section alignment axis (46) so that the selected pipe section (27) can easily interface with the drilling head (34) and the breakout clamp assembly (38). In the preferred embodiment the selected pipe section (27) is at a substantially vertical orientation when it is at the drilling head interface position (160).

Referring to FIGS. 5-12 and FIGS. 20-22, the pipe handling device (60) is comprised of a pipe clamping mechanism (162) for holding the selected pipe section (27). In the preferred embodiment the pipe clamping mechanism (162) is comprised of a handling device clamp assembly (164) which is comprised of two substantially identical handling clamps (166) which are configured to hold the selected pipe section (27) at two axially spaced positions along the length of the selected pipe section (27).

Figure 17:
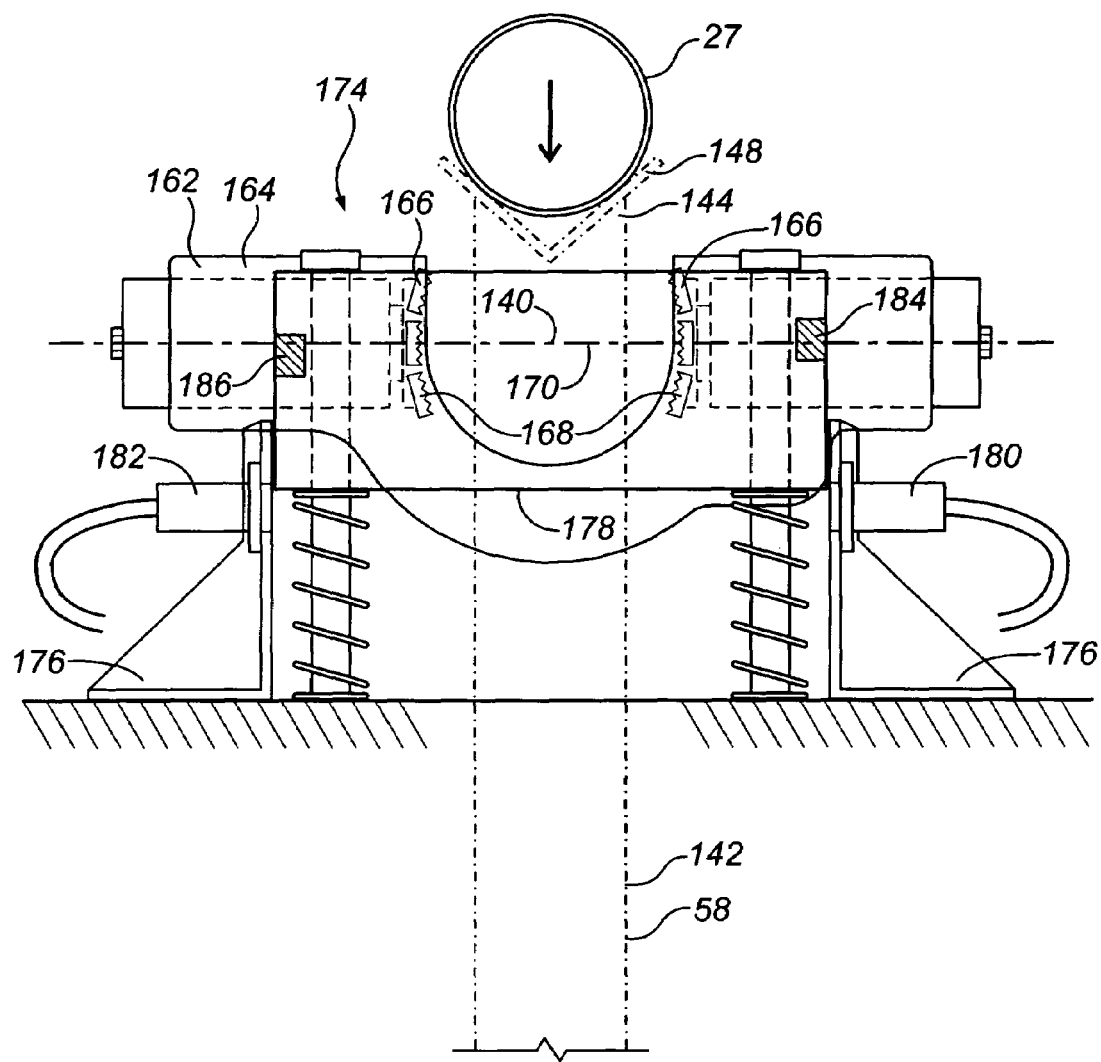
FIG. 17 is a schematic view of the pipe clamping mechanism and the pipe diameter sensing device according to the preferred embodiment of the apparatus of the invention, depicting a selected pipe section as it is being lowered to the pipe transfer position by the pipe transfer device.
Figure 18:
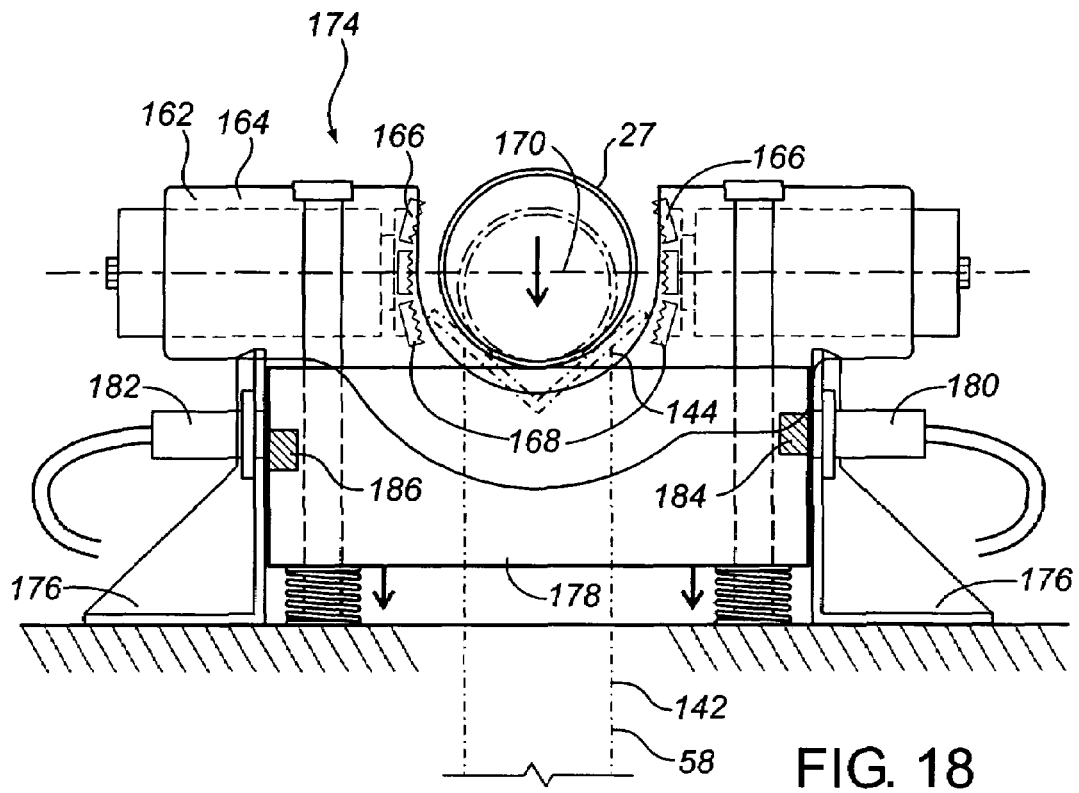
FIG. 18 is a schematic view of the pipe clamping mechanism and the pipe diameter sensing device according to the preferred embodiment of the apparatus of the invention, depicting a selected pipe section after it has been lowered to the pipe transfer position by the pipe transfer device and showing the first sensor plug adjacent to the first sensor.
Figure 19:
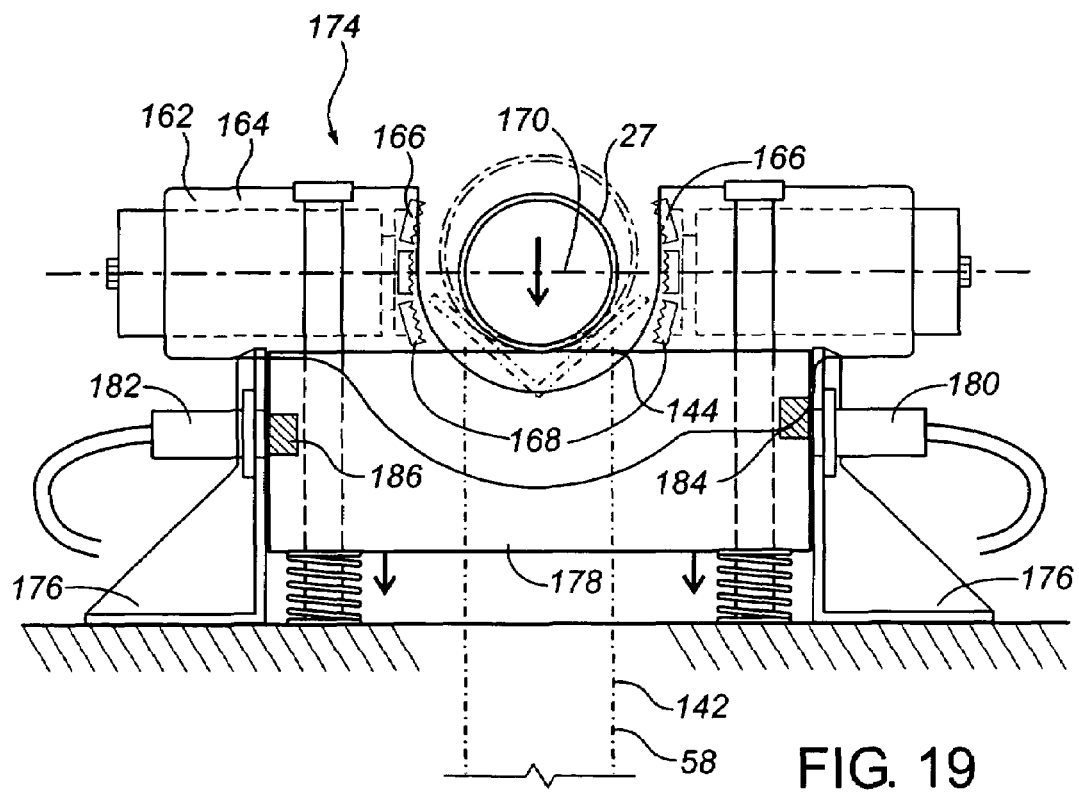
FIG. 19 is a schematic view of the pipe clamping mechanism and the pipe diameter sensing device according to the preferred embodiment of the apparatus of the invention, depicting a selected pipe section, having a diameter different than the selected pipe section depicted in FIG. 18, after it has been lowered to the pipe transfer position by the pipe transfer device and showing the second sensor plug adjacent to the second sensor.

Referring to FIGS. 17-19, each of the handling clamps (166) is comprised of a pair of opposed jaws (168) which may be actuated to move toward each other to grip and hold the selected pipe section (27) and which may be actuated to move away from each other to release the selected pipe section (27).

In the preferred embodiment, the handling clamps (166) are configured so that they are simultaneously actuated to grip and hold the selected pipe section (27), but also so that they must be independently actuated to release the selected pipe section (27). As a result, in the preferred embodiment, the likelihood of accidents due to inadvertent release of the selected pipe section (27) by the pipe clamping mechanism (162) is reduced, since an operator of the apparatus (20) must execute two separate commands in order to cause both of the handling clamps (166) to release. In the preferred embodiment the two separate commands may consist of moving a joystick (not shown) along a first axis in order to cause one of the handling clamps (166) to release, and moving the joystick along a second axis in order to cause the other of the handling clamps (166) to release.

The opposed jaws (168) define a gripping axis (170). The pipe transfer device (58) is configured to deliver the selected pipe section (27) to the pipe handling device (60) so that a pipe section axis (172) of the selected pipe section (27) substantially coincides with the gripping axes (170) of the handling clamps (166), thus ensuring that the selected pipe section (27) will be held substantially concentrically by the pipe clamping mechanism (162). Similarly, the pipe transfer device (58) is configured to accept the selected pipe section (27) from the pipe handling device (60) at a position where the pipe section axis (172) substantially coincides with the gripping axis (170), thus ensuring a positive transfer of the selected pipe section (27) from the pipe handling device (60) to the pipe transfer device (58).

As a result, in the preferred embodiment the apparatus (20) is further comprised of a pipe diameter sensing device (174) for providing an indication of a diameter of the selected pipe section (27) before it is clamped by the pipe clamping mechanism (162). The pipe diameter sensing device (174) is operatively connected with the pipe transfer device (58) and the pipe transfer device is configured to position the selected pipe section (27) in response to the indication from the pipe diameter sensing device (174) so that the pipe section axis (172) substantially coincides with the gripping axis (170) and so that the selected pipe section (27) is held substantially concentrically by the pipe clamping mechanism (162) when it is clamped at the pipe transfer position (140) by the pipe clamping mechanism (162).

Referring again to FIGS. 17-19, the pipe diameter sensing device (174) is comprised of a sensor frame (176) and a spring biased sensor plunger (178) which is vertically reciprocable relative to the sensor frame (176). The sensor frame (176) includes a first sensor (180) and a second sensor (182) which are fixed in the sensor frame (176). The sensor plunger (178) includes an adjustable first sensor plug (184) which is associated with the first sensor (180) and an adjustable second sensor plug (186) which is associated with the second sensor (182).

In the preferred embodiment the sensors (180,182) are both proximity sensors or proximity switches which provide a sensor output when their respective sensor plugs (184) are proximate or adjacent to them. The sensor outputs from the sensors (180,182) is used to control the movement of the pipe transfer device (58), either by directly switching the pipe transfer device (58) or by providing a switching command to a switch (not shown) associated with the pipe transfer device (58).

The pipe diameter sensing device (174) may be switched manually or automatically to recognize a sensor output from either the first sensor (180) or the second sensor (182). The sensor output from the first sensor (180) relates to a first diameter of pipe section (27) and the sensor output from the second sensor relates to a second diameter of pipe section (27).

Referring to FIG. 18, if the diameter of the selected pipe section (27) is the first diameter, the pipe diameter sensing device (174) is switched to recognize the sensor output from the first sensor (180) so that the pipe transfer device (58) will position the selected pipe section (27) correctly relative to the gripping axis (170) of the pipe clamping mechanism (162).

Referring to FIG. 19, if the diameter of the selected pipe section (27) is the second diameter, the pipe diameter sensing device (174) is switched to recognize the sensor output from the second sensor (182) so that the pipe transfer device (58) will position the selected pipe section (27) correctly relative to the gripping axis (170) of the pipe clamping mechanism (162).

The pipe diameter sensing device (174) may be switched manually by an operator of the apparatus (20) or may be switched automatically. For example, the pipe diameter sensing device (174) may be switched automatically with reference to which of the pipe storage bins (54,56) the selected pipe section (27) is being removed from or delivered to.

The pipe diameter sensing device (174) is located adjacent to or within the pipe clamping mechanism (162). In operation, as the pipe transfer device (58) moves the selected pipe section (27) between the opposed jaws (168) of the pipe clamping mechanism (162), the sensor plunger (178) is depressed by the selected pipe section (27) until the appropriate sensor plug (184,186) is opposite the appropriate sensor (180,182), thus triggering a sensor output which essentially indicates that the pipe section axis (172) is substantially coincident with the gripping axis (170). The sensor output causes the pipe transfer device (58) to stop moving so that the selected pipe section (27) is properly positioned for gripping by the pipe clamping mechanism (162).

The pipe diameter sensing device (174) as described above may be used to sense the diameters of two different sizes of pipe section (27). The two diameters to be sensed by the pipe diameter sensing device (174) may be adjusted by adjusting the vertical positions of the sensor plugs (184,186) in the sensor plunger (178).

Figure 20:
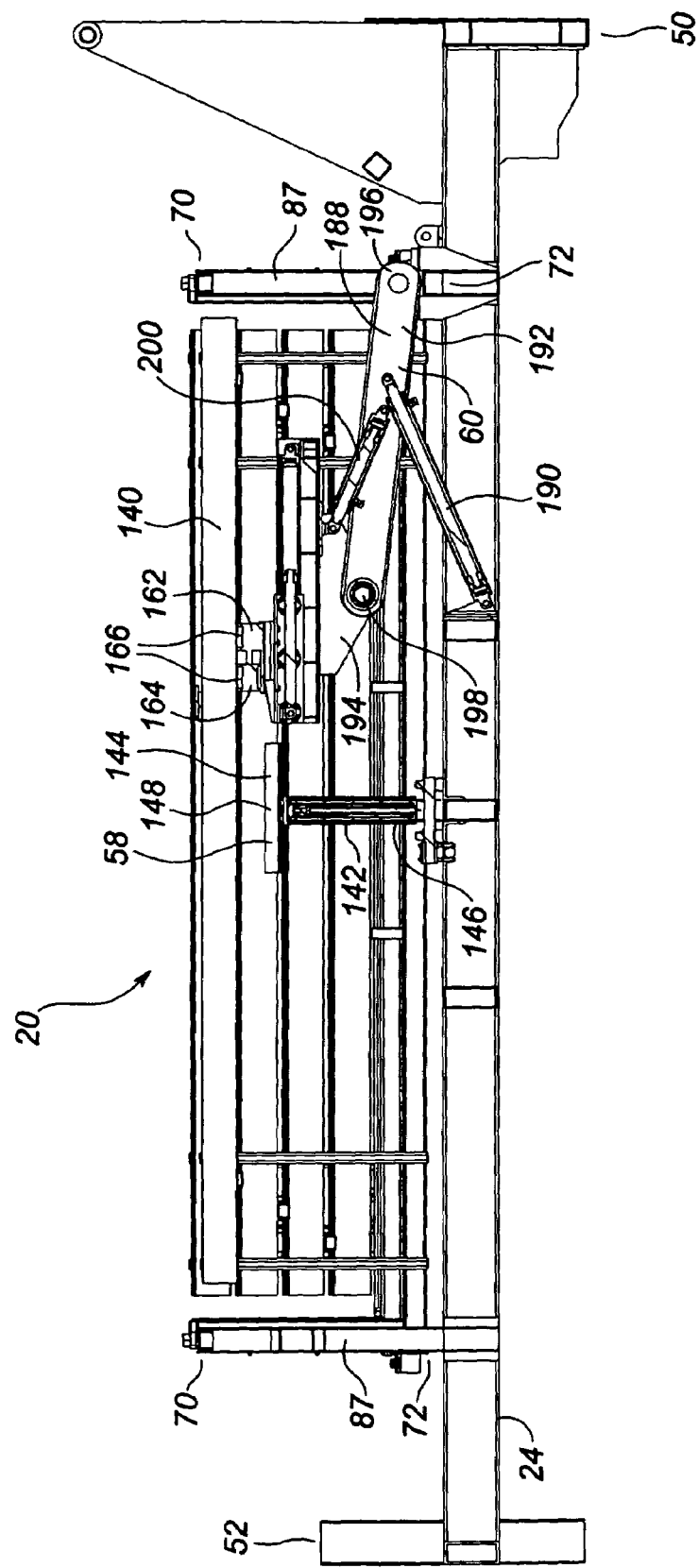
FIG. 20 is a side view of the preferred embodiment of the apparatus of the invention, depicting a selected pipe section positioned at a substantially horizontal orientation at the pipe transfer position.
Figure 21:
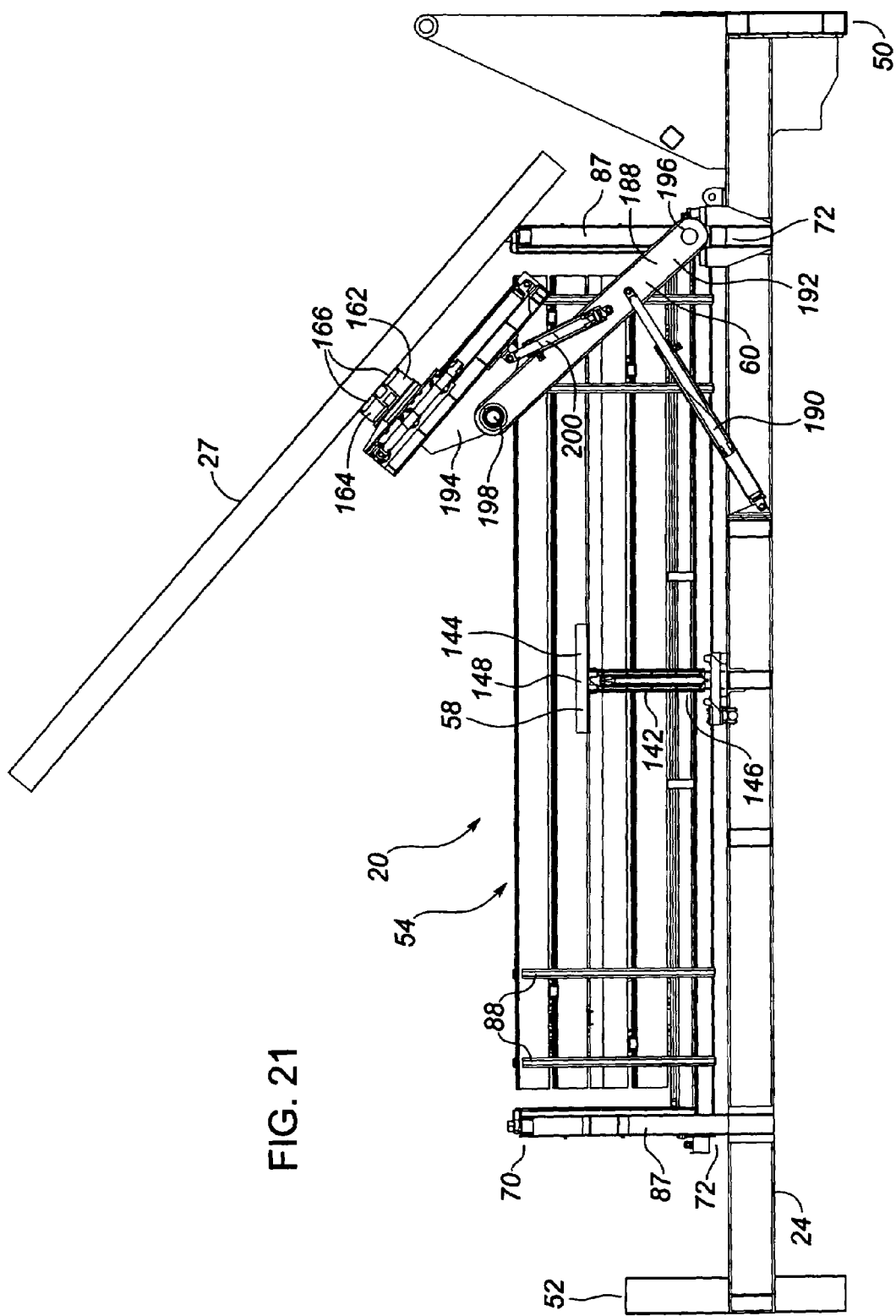
FIG. 21 is a side view of the preferred embodiment of the apparatus of the invention, depicting a selected pipe section positioned between the pipe transfer position and the drilling head interface position.
Figure 22:
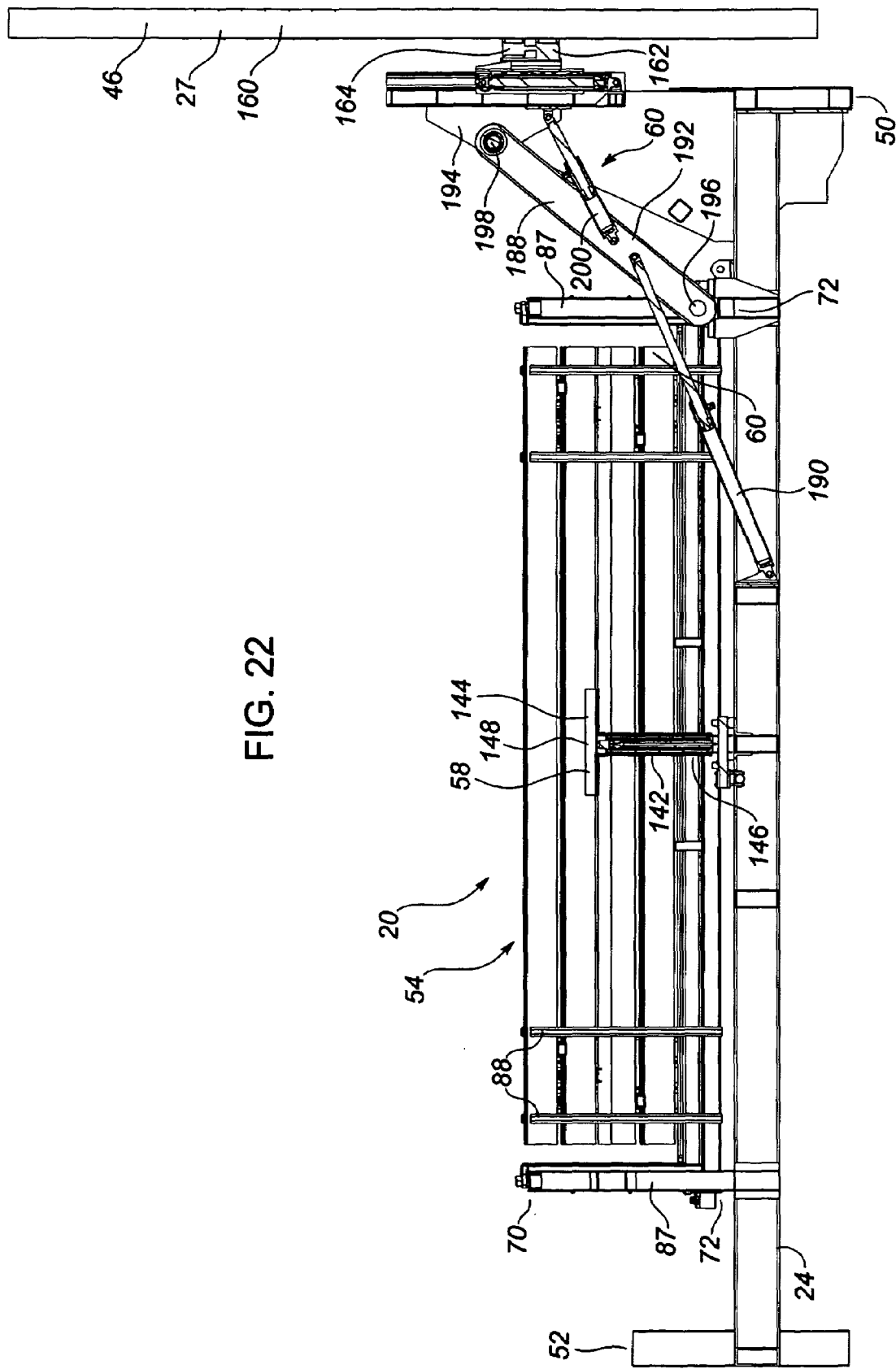
FIG. 22 is a side view of the preferred embodiment of the apparatus of the invention, depicting a selected pipe section positioned at a substantially vertical orientation at the drilling head interface position.

Referring to FIGS. 20-22, the pipe handling device (60) is further comprised of a pipe handling arm (1 88). The pipe handling arm (188) is pivotably connected to the chassis (24)

so that the pipe handling arm (188) may pivot to move the selected pipe section (27) between the pipe transfer position (140) and the drilling head interface position (160). The pivoting of the pipe handling arm (188) is effected by actuating a handling arm cylinder (190) connected between the pipe handling arm (188) and the chassis (24).

As indicated, the selected pipe section (27) must move between a substantially horizontal orientation at the pipe transfer position (140) and a substantially vertical orientation at the drilling head interface position (160). However, the pipe handling arm (188) is pivotably connected to the chassis (24) at a location which is horizontally offset from the pipe section alignment axis (46) and the drilling head interface position (160), so that the pipe handling arm (188) does not interfere with the operations of the derrick (22). The pipe handling arm (188) must therefore pivot greater than ninety degrees in order to move the selected pipe section (27) between the pipe transfer position (140) and the drilling head interface position (160).

As a result, in the preferred embodiment the pipe handling arm (188) is comprised of a primary pipe handling arm (192) and a secondary pipe handling arm (194). A lower end (196) of the primary pipe handling arm (192) is pivotably connected with the chassis (24) and the secondary pipe handling arm (194) is pivotably connected with an upper end (198) of the primary pipe handling arm (192). The pipe clamping mechanism (162) and the pipe diameter sensing device (174) are located on the secondary pipe handling arm (194). Pivoting of the secondary pipe handling arm (194) relative to the primary pipe handling arm (192) is effected by actuating a secondary handling arm cylinder (200) connected between the primary pipe handling arm (192) and the secondary pipe handling arm (194).

The purpose of the secondary pipe handling arm (194) is to pivot relative to the primary pipe handling arm (192) as the primary pipe handling arm (192) pivots in order to enable the selected pipe section (27) to move between a substantially horizontal orientation at the pipe transfer position (140) and a substantially vertical orientation at the drilling head interface position (160).

In the preferred embodiment, the actuation of the handling arm cylinder (190) is linked with the actuation of the secondary handling arm cylinder (200) so that the pivoting of the primary pipe handling arm (192) and the pivoting of the secondary pipe handling arm (194) are coordinated. More specifically, in the preferred embodiment, the handling arm cylinder (190) functions as a master cylinder and the secondary handling arm cylinder (200) functions as a slave cylinder.

The pipe handling arm (188) is therefore required only to perform a combination of relatively simple pivoting movements in order to move the selected pipe section (27) between the substantially fixed pipe transfer position (140) and the substantially fixed drilling head interface position (160).

The method of the invention may be performed using any apparatus or combination of apparatus which is capable of performing the steps of the method. Preferably the method is performed using the apparatus (20) of the invention. In the preferred embodiment of the method, the method is performed using the preferred embodiment of the apparatus (20) as described above.

As a result, in performing the method of the invention using the preferred embodiment of the apparatus (20), the truck (26) carrying the apparatus (20), the drilling head (34) and the derrick (22) is driven to a drilling site (not shown). During transport, the mast (28) of the derrick (22) is in the lowered position and the pipe storage bins (54,56) are pivoted so that they lean toward their outboard sides (74). Pipe sections (27) may be transported to the drilling site with the apparatus (20) and the derrick (22), or they may be loaded into the pipe storage bins (54,56) at the drilling site.

At the drilling site, the mast (28) is pivoted to the raised position and the pipe storage bins (54,56) are pivoted so that they lean toward their inboard sides (76). The apparatus (20) is then ready to transfer pipe sections (27) from the pipe storage bins (54,56) to the drilling head (34).

Figure 5:
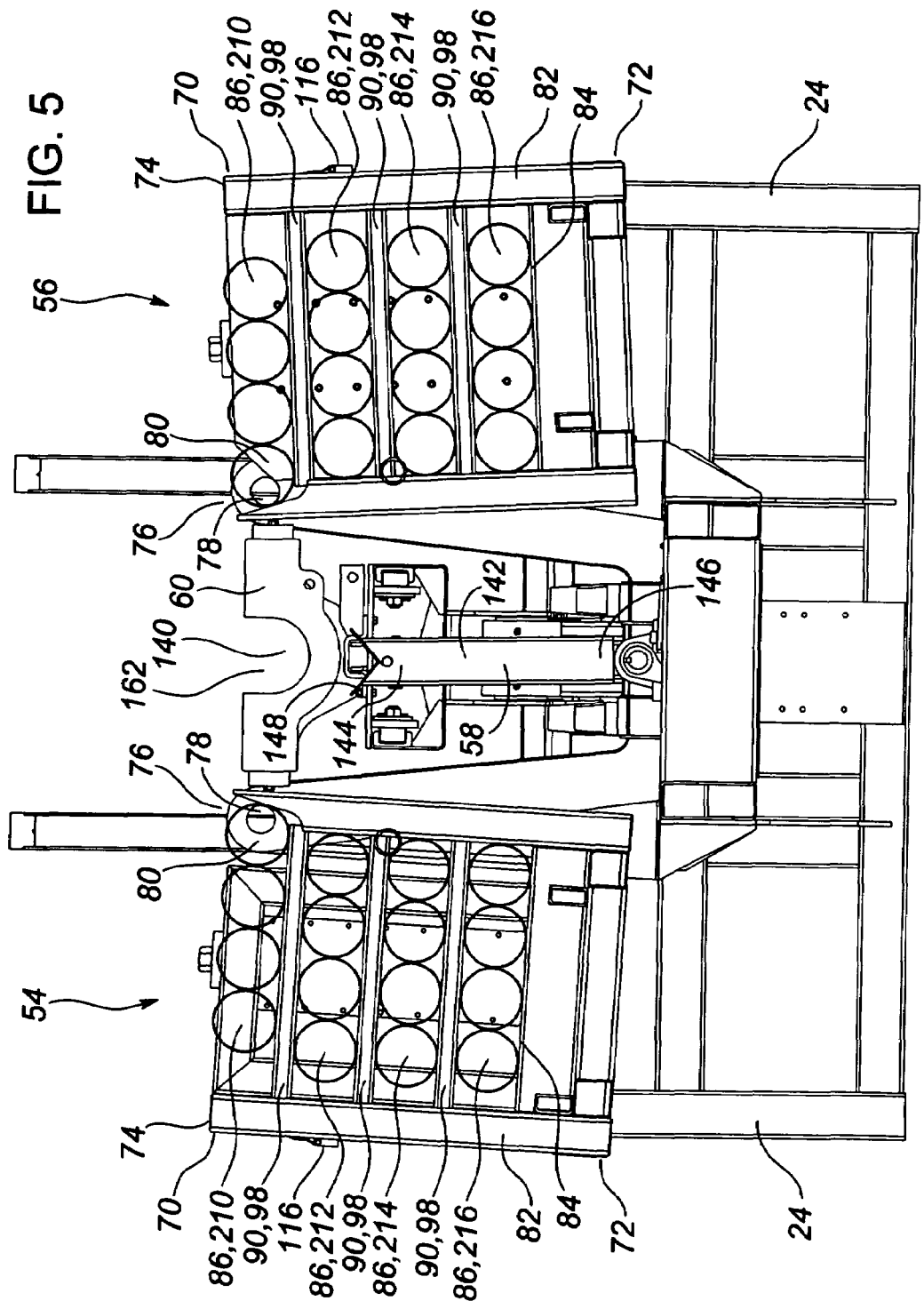
FIG. 5 is a transverse cross-section view of the preferred embodiment of the apparatus of the invention, taken along section line X-X of FIG. 4, showing the apparatus in a ready position ready for moving pipe sections from the apparatus to the drilling head interface position.

Referring to FIG. 5, in the preferred embodiment of the apparatus (20) the pipe storage bins (54,56) initially include four pipe storage layers (86) which are separated by spacer bars (98). A first uppermost pipe storage layer (210) is vertically aligned with the bin dispensing position (80) and the pipe sections (27) in the uppermost pipe storage layer (210) are directed by gravity toward the bin dispensing position (80) due to the pivoting of the pipe storage bins (54,56).

The pipe storage bins (54,56) may be emptied one after the other, or the pipe sections (27) may be withdrawn alternately from the first pipe storage bin (54) and the second pipe storage bin (56).

In the preferred embodiment of the method, the first pipe storage bin (54) contains pipe sections (27) all having a first diameter and the second pipe storage bin (56) contains pipe sections (27) all having a second diameter which is smaller than the first diameter, with the result that the first pipe storage bin (54) is emptied of the required number of pipe sections (27) having the first diameter before the second pipe storage bin (56) is emptied of the required number of pipe sections (27) having the second diameter. The method of the invention will be described primarily with respect to transferring pipe sections (27) between the first pipe storage bin (54) and the derrick (22).

Referring again to FIG. 5, the pivoting of the first pipe storage bin (54) toward the inboard side (76) results in the most inboard pipe section (27) in the uppermost pipe storage layer (86) being presented to the bin dispensing position (80) of the first pipe storage bin (54) as a selected pipe section (27).

Figure 6:
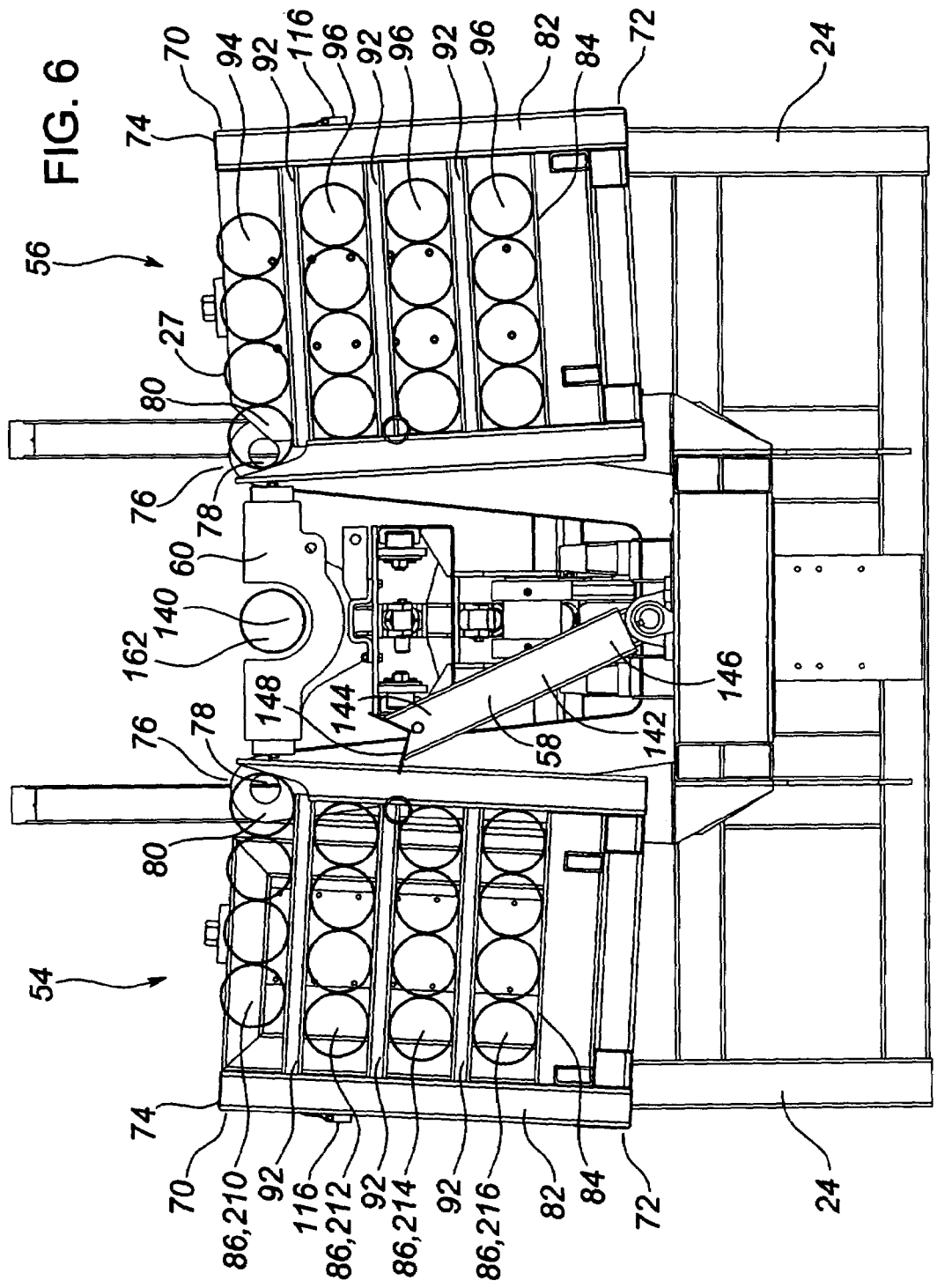
FIG. 6 is a transverse cross-section view of the preferred embodiment of the apparatus of the invention, taken along section line X-X of FIG. 4, showing the first uppermost pipe storage layer of the first pipe storage bin vertically aligned with the bin dispensing position of the first pipe storage bin and showing the pipe transfer device radially aligned with the bin dispensing position of the first pipe storage bin.
Figure 7:
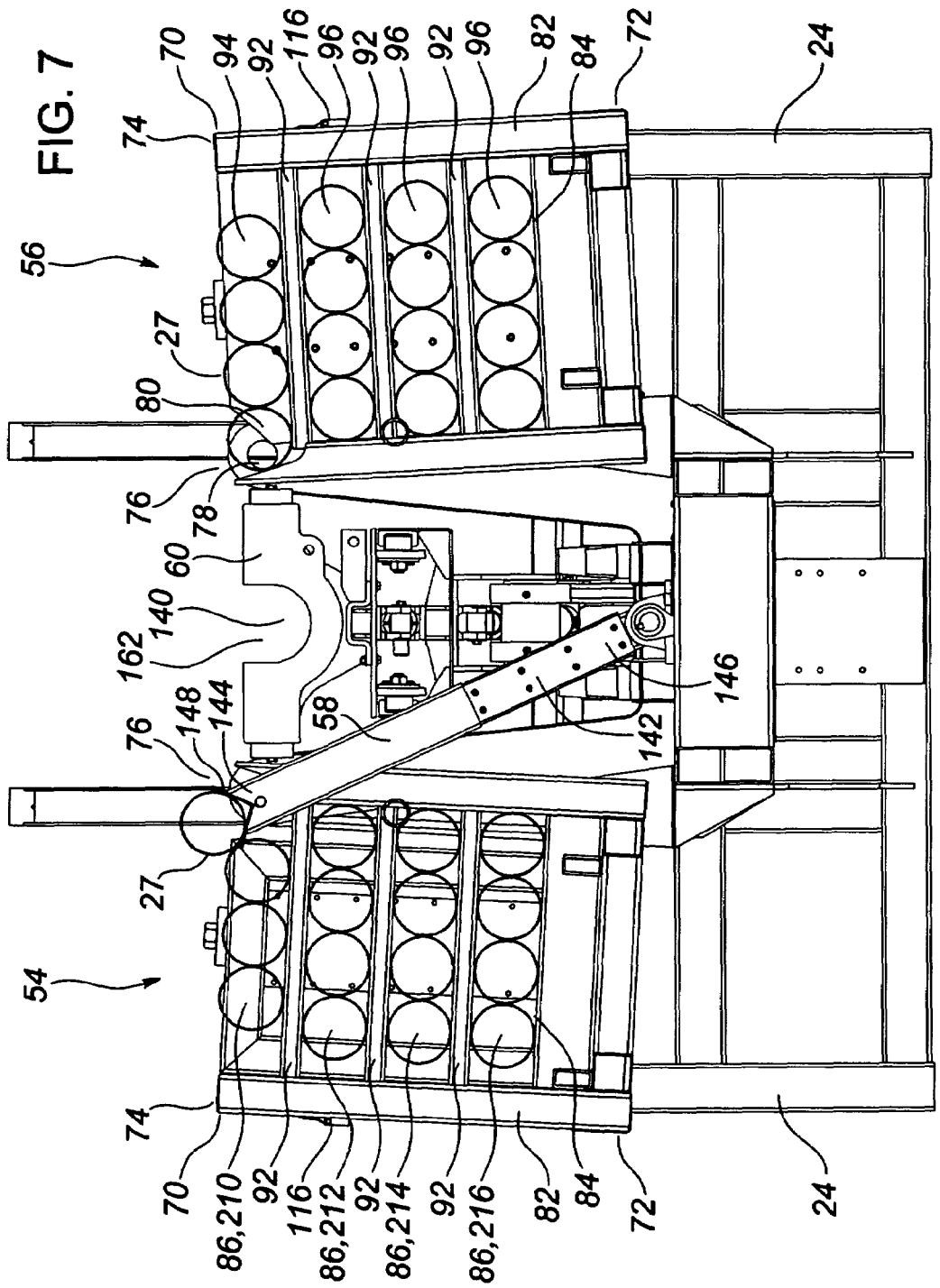
FIG. 7 is a transverse cross-section view of the preferred embodiment of the apparatus of the invention, taken along section line X-X of FIG. 4, showing the selected pipe section engaged by the pipe transfer device.

Referring to FIGS. 6 and 7, the pipe transfer arm (142) is then moved to the bin dispensing position (80) in order to engage the selected pipe section (27) at the bin dispensing position (80). In order to perform this step, the pipe transfer arm (142) first pivots from a position at which it is radially aligned with the pipe transfer position (140) to a position at which it is radially aligned with the bin dispensing position (80), and the length of the pipe transfer arm (142) is then extended so that the pipe transfer arm (142) engages the selected pipe section (27) at the bin dispensing position (80).

Figure 8:
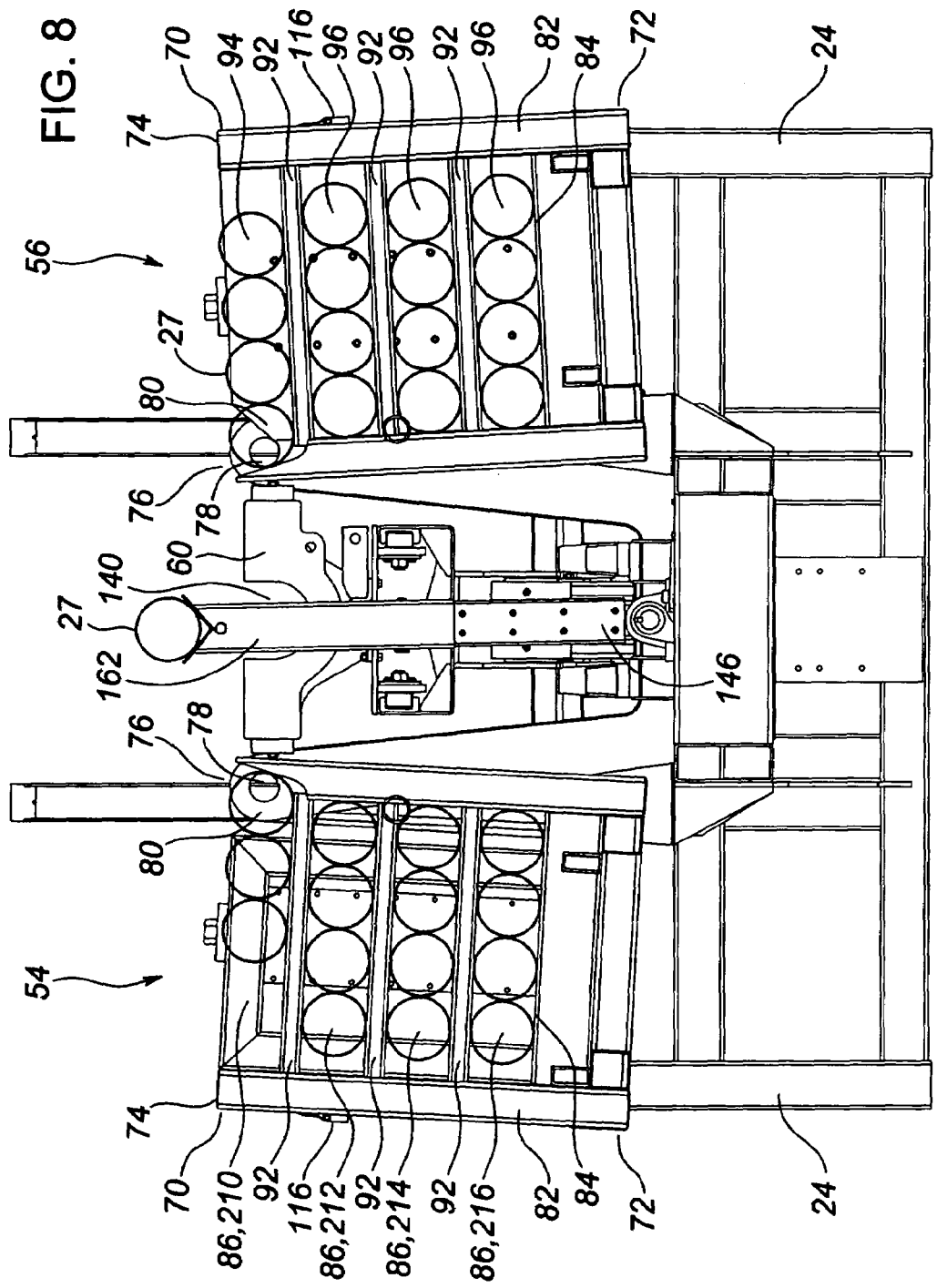
FIG. 8 is a transverse cross-section view of the preferred embodiment of the apparatus of the invention, taken along section line X-X of FIG. 4, showing the pipe transfer device radially aligned with the pipe transfer position.
Figure 9:
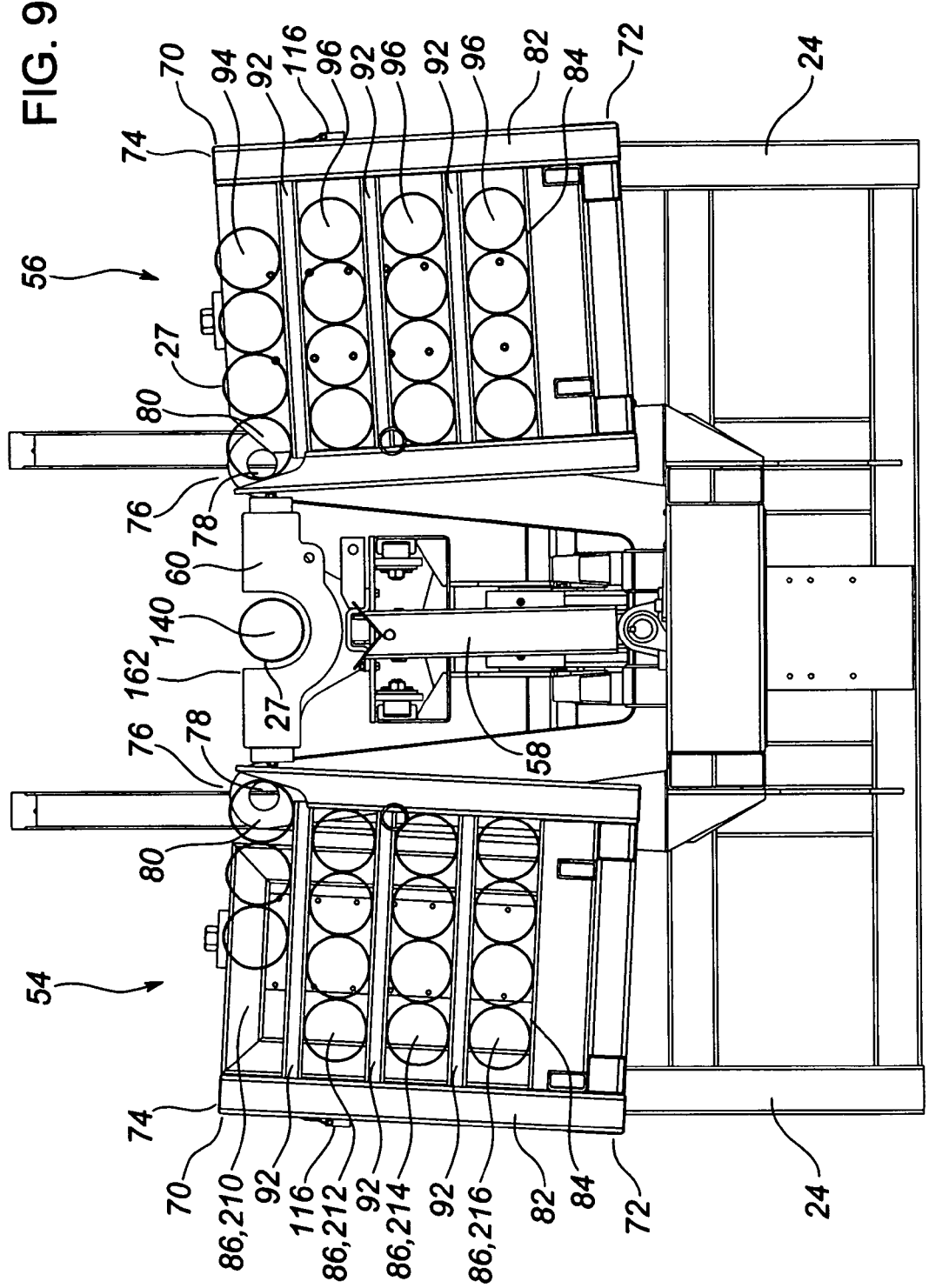
FIG. 9 is a transverse cross-section view of the preferred embodiment of the apparatus of the invention, taken along section line X-X of FIG. 4, showing the selected pipe section positioned at the pipe transfer position and clamped by the pipe clamping mechanism.

Referring to FIGS. 8 and 9, the selected pipe section (27) is then transferred from the bin dispensing position (80) to the pipe transfer position (140) with the pipe transfer arm (142). This step is performed by extending the length of the pipe transfer arm (142) so that the selected pipe section (27) is unobstructed by the bin frame retainers (88) on the first pipe storage bin (54), pivoting the pipe transfer arm (142) from the bin dispensing position (80) to a position at which it is radially aligned with the pipe transfer position (140), and then reducing the length of the pipe transfer arm (142) so that the selected pipe section (27) is lowered to the pipe transfer position (140).

Referring to FIGS. 17-19, as the selected pipe section (27) is lowered to the pipe transfer position (140), the sensor plunger (178) of the pipe diameter sensing device (174) is depressed by the selected pipe section (27) until the appropriate sensor plug (184,186) encounters the appropriate sensor (180,182), which provides an indication of the diameter of the selected pipe section (27), causes the pipe transfer arm (142) to stop lowering the selected pipe section (27), and results in the pipe section axis (172) of the selected pipe section (27) being substantially coincident with the gripping axis (170) of the pipe clamping mechanism. The selected pipe section (27) is thus positioned at the pipe transfer position (140).

The selected pipe section (27) is then engaged by the pipe handling arm (188) at the pipe transfer position (160). This step is performed by actuating the opposed jaws (168) of the pipe clamping mechanism (162) so that they clamp and hold the selected pipe section (27) substantially concentrically between them.

Referring to FIGS. 20-22, the selected pipe section (27) is then moved with the pipe handling arm (188) from the pipe transfer position (140) to the drilling head interface position (160). This step is performed by pivoting the primary pipe handling arm (192) relative to the chassis (24) and pivoting the secondary pipe handling arm (194) relative to the primary pipe handling arm (192) so that the selected pipe section (27) moves from a substantially horizontal orientation at the pipe transfer position (140) to a substantially vertical orientation at the drilling head interface position (160).

As the selected pipe section (27) moves to the drilling head interface position (160), it passes though the open side (48) of the derrick (22) to the interior derrick space (44) and becomes substantially aligned with the pipe section alignment axis (46) and the drilling head (34).

The drilling head (34) is then moved vertically downward along the derrick (22) until the threaded connector (36) on the drilling head (34) engages the threads on the end of the selected pipe section (27). The drilling head (34) is then actuated to rotate the threaded connector (36) so that the selected pipe section (27) becomes threadably connected with the drilling head (34).

The pipe clamping mechanism (162) is then actuated so that the opposed jaws (168) release the selected pipe section (27), and the pipe handling arm (188) pivots back toward the pipe transfer position (140) so that it is ready to accept another pipe section (27).

If the selected pipe section (27) is the first pipe section (27) making up a drill string, the drilling head (34) lowers the selected pipe section (27) so that a drill bit (not shown) can be attached to the lower end of the selected pipe section (27) in preparation for drilling.

If however, drilling has commenced and a drill string already extends from the drilled borehole, the selected pipe section (27) is lowered to the drill string by the drilling head (34), is clamped by the upper breakout clamp (40), and is then rotated by the upper breakout clamp (40) while the drill string is held by the lower breakout clamp (42) in order to "make" the connection between the selected pipe section (27) and the drill string. Once the connection is made, the breakout clamp assembly (38) releases the selected pipe section (27) and the drill string and the drilling head (34) resumes drilling.

The pipe sections (27) are removed from the first pipe storage bin (54) individually and are individually delivered to the drilling head interface position (160) in the manner as described above. As a selected pipe section (27) in the uppermost pipe storage layer (210) is removed, another pipe section (27) in the uppermost pipe storage layer (210) is presented to the bin dispensing position (80) due to the effects of gravity.

Figure 10:
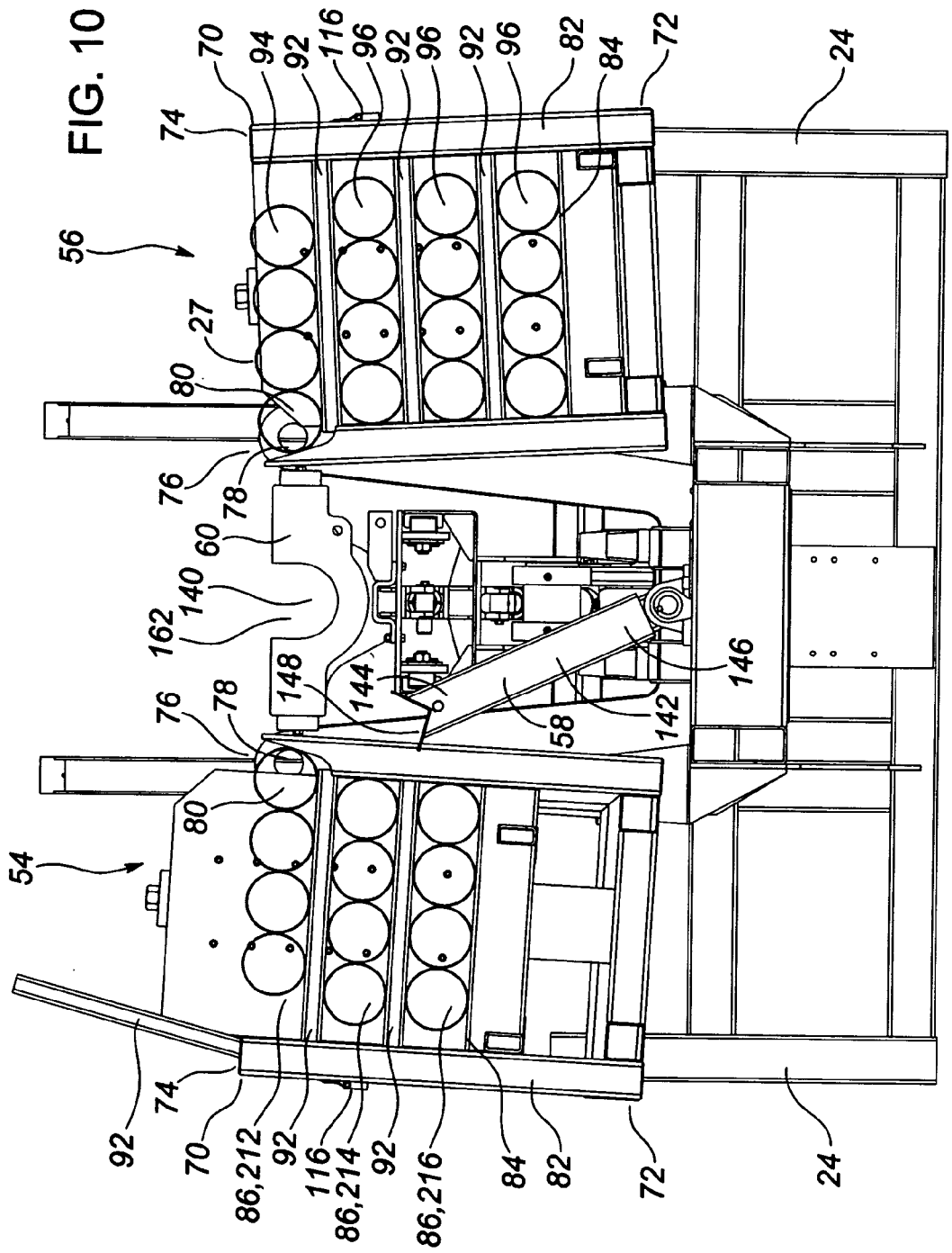
FIG. 10 is a transverse cross-section view of the preferred embodiment of the apparatus of the invention, taken along section line X-X of FIG. 4, showing the second uppermost pipe storage layer of the first pipe storage bin vertically aligned with the bin dispensing position of the first pipe storage bin and showing the pipe transfer device radially aligned with the bin dispensing position of the first pipe storage bin.
Figure 14:
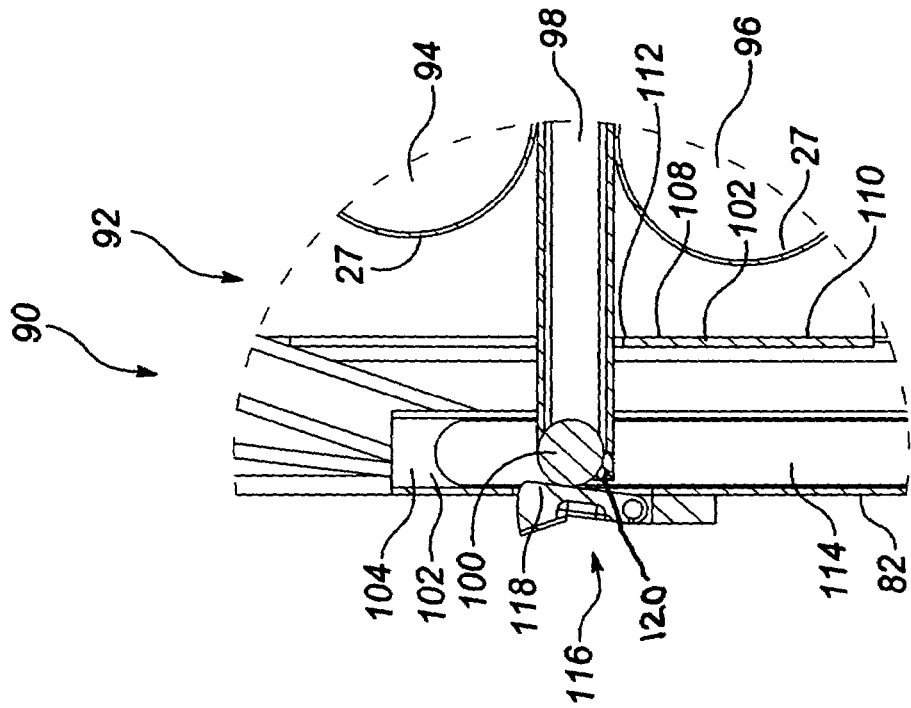
FIG. 14 is a section view of a portion of a pipe storage bin depicting components of the preferred embodiment of spacer bar assembly, including a spacer bar, a spacer bar guideway, and a latch mechanism, in which the spacer bar is in the extended position and located adjacent to the detent of the latch mechanism.
Figure 13:
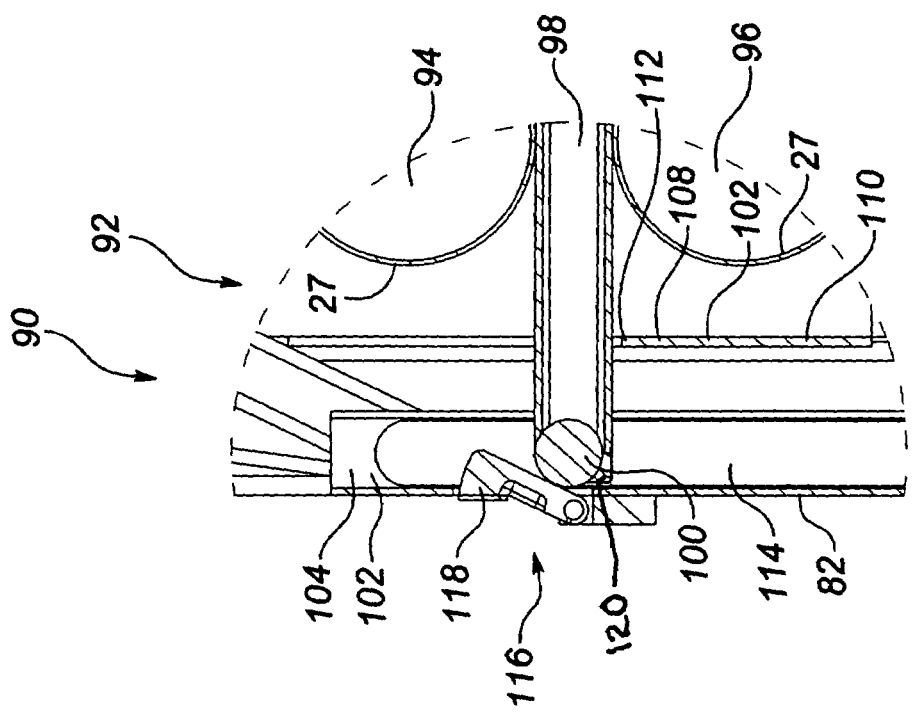
FIG. 13 is a section view of a portion of a pipe storage bin depicting components of the preferred embodiment of spacer bar assembly, including a spacer bar, a spacer bar guideway, and a latch mechanism, in which the spacer bar is in the extended position and located below the spacer bar stop position.
Figure 16:
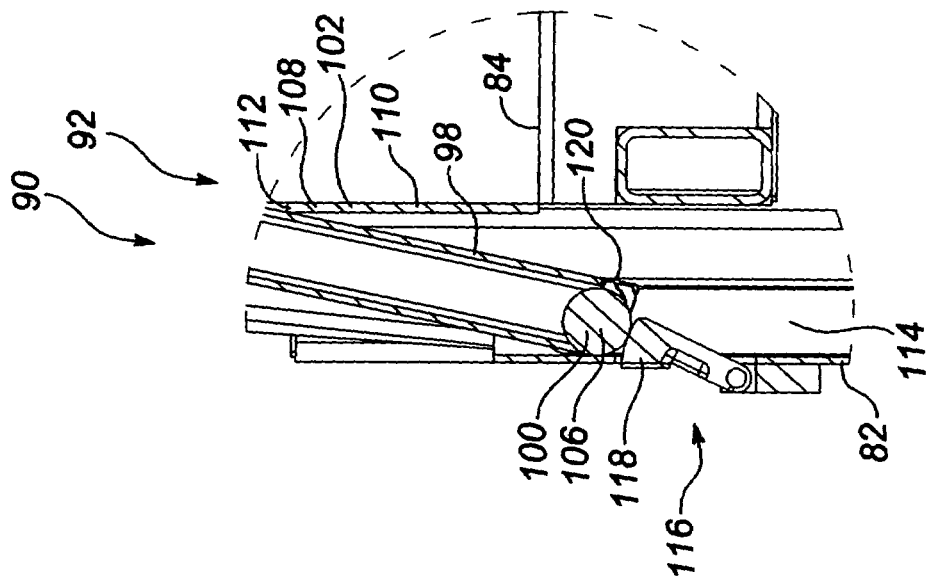
FIG. 16 is a section view of a portion of a pipe storage bin depicting components of the preferred embodiment of spacer bar assembly, including a spacer bar, a spacer bar guideway, and a latch mechanism, in which the spacer bar is in the withdrawn position and located above the detent of the latch mechanism.
Figure 15:
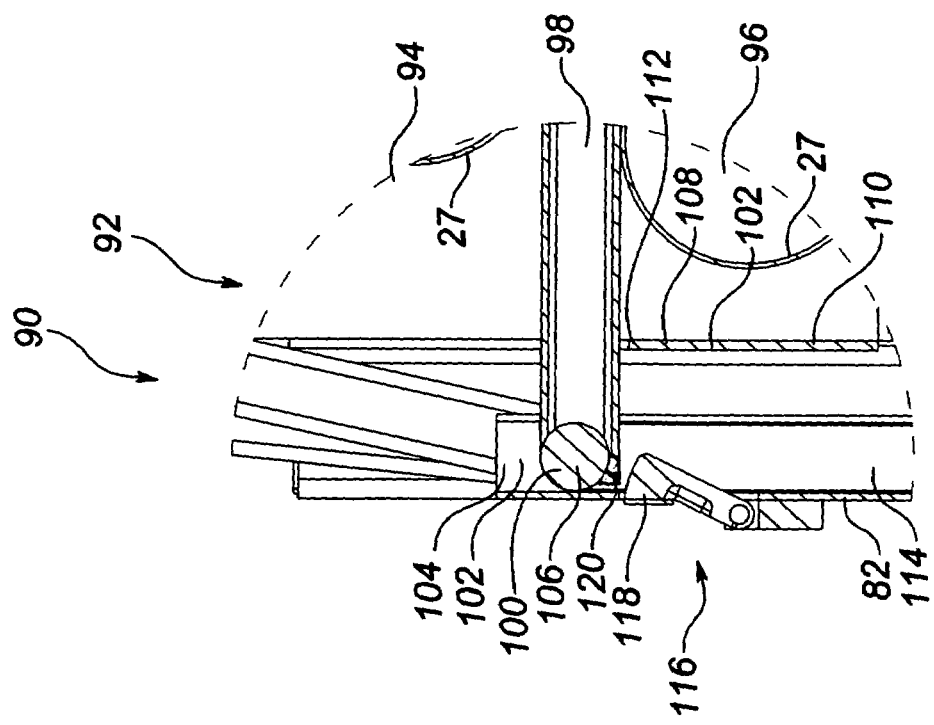
FIG. 15 is a section view of a portion of a pipe storage bin depicting components of the preferred embodiment of spacer bar assembly, including a spacer bar, a spacer bar guideway, and a latch mechanism, in which the spacer bar is in the extended position and located above the detent of the latch mechanism.

Referring to FIG. 10, when the uppermost pipe storage layer (210) is emptied, the pipe rack (84) moves vertically upward until a second uppermost pipe storage layer (212) is vertically aligned with the bin dispensing position (80). At the same time, the spacer bars (98) between the first uppermost pipe storage layer (210) and the second uppermost pipe storage layer (212) pivot upward to the withdrawn position, where they are supported by their associated latch mechanisms (116).

The pipe sections (27) are then individually removed from the second uppermost pipe storage layer (212) until the second uppermost pipe storage layer (212) is emptied.

Referring to FIG. 11, when the second uppermost pipe storage layer (212) is emptied, the pipe rack (84) moves vertically upward until a third uppermost pipe storage layer (214) is vertically aligned with the bin dispensing position (80). At the same time, the spacer bars (98) between the second uppermost pipe storage layer (212) and the third uppermost pipe storage layer (214) pivot upward to the withdrawn position, where they are supported by their associated latch mechanisms (116).

The pipe sections (27) are then individually removed from the third uppermost pipe storage layer (214) until the second uppermost pipe storage layer (214) is emptied.

Referring to FIG. 12, when the third uppermost pipe storage layer (214) is emptied, the pipe rack (84) moves vertically upward until a fourth uppermost pipe storage layer (216) is vertically aligned with the bin dispensing position (80). At the same time, the spacer bars (98) between the third uppermost pipe storage layer (214) and the fourth uppermost pipe storage layer (216) pivot upward to the withdrawn position, where they are supported by their associated latch mechanisms (116).

Once all of the required pipe sections (27) have been removed from the first pipe storage bin (54) and added to the drill string, the apparatus (20) may begin removing pipe sections (27) from the second pipe storage bin (56). All of the pipe storage layers (86) in the first pipe storage bin (54) do not need to be emptied before the apparatus (20) may begin removing pipe sections (27) from the second pipe storage bin (56).

In order to remove pipe sections from the second pipe storage bin (56), the pipe transfer arm (142) moves between a substantially fixed bin dispensing position (80) on the second pipe storage bin (56) and the pipe transfer position (140) in order to transfer pipe sections (27) from the second pipe storage bin (56) to the pipe transfer position (140).

In preparation for the removal of pipe sections (27) from the second pipe storage bin (56), the pipe diameter sensing device (174) is manually switched so that the appropriate one of the sensors (180,182) is operative to provide the indication of the diameter of the pipe sections (27) as they are lowered into the pipe clamping mechanism (162) by the pipe transfer arm (142). Alternatively, the pipe diameter sensing device (174) may be switched automatically as the pipe transfer arm (142) is switched to move toward the second pipe storage bin (56).

Once drilling is stopped, the pipe sections (27) may be returned to the pipe storage bins (54,56) from the derrick (22) by reversing the operation of the apparatus (20) and by reversing the performance of the steps of the method.

The apparatus (20) and method of the invention facilitate relatively efficient drilling of boreholes and also enable the use of pipe sections (27) having a plurality of different diameters. The pipe storage bins (54,56) may be configured to store two or more sizes of pipe sections (27) by appropriate configuration of the pivot plates (110). In addition, the pipe diameter sensing device (174) enables the sensing of two different pipe section (27) diameters at any given time simply by switching the pipe diameter sensing device (174), and the pipe diameter sensing device (174) can be configured relatively easily to sense other pipe section (27) diameters by adjusting the positions of the sensor plugs (184,186).

The operations of the apparatus (20) of the invention to perform the method of the invention may be controlled by as few as one person, and the pipe sections (27) need not be manually handled either during movement of the pipe sections (27) to the drilling head (34) or during delivery of the pipe sections (27) back to the pipe storage bins (54,56). As a result, the apparatus (20) and method of the invention provide a relatively efficient and safe system for handling pipe sections (27).

The embodiments of the invention in which an exclusive property or privilege is claimed are defined as follows:

1. A pipe handling apparatus for use with a drilling head, the apparatus comprising:
   (a) a chassis;
   (b) a pipe storage bin for storing a plurality of pipe sections in a substantially horizontal pipe orientation, wherein the pipe storage bin is comprised of an upper end and a lower end providing at least one pipe storage layer therebetween, wherein the upper end of the pipe storage bin is mounted on the chassis at upper pivot connections defining a bin pivot axis which is substantially parallel with the pipe orientation, wherein the bin pivot axis is fixed relative to the chassis, wherein the pipe storage bin is pivotable about the bin pivot axis, wherein the pipe storage bin defines a bin dispensing position as the pipe storage bin pivots about the bin pivot axis, and wherein the bin pivot axis substantially coincides with the bin dispensing position such that the bin dispensing position is substantially fixed as the pipe storage bin pivots about the bin pivot axis, whereby the pipe sections are removed from the pipe storage bin at the bin dispensing position and whereby the pipe sections are delivered to the pipe storage bin at the bin dispensing position;
   (c) a pipe transfer device pivotably mounted on the chassis for individually transferring a selected pipe section between the bin dispensing position and a pipe transfer position;
   (d) a pipe handling device for individually moving the selected pipe section between the pipe transfer position and a drilling head interface position;
   (e) wherein the pipe storage bin is further comprised of an outboard side and an inboard side, wherein the pipe handling device is located adjacent to the inboard side of the pipe storage bin, and wherein the bin pivot axis is located substantially at the inboard side of the pipe storage bin;
   (f) wherein the pipe storage bin is further comprised of a spacer mechanism for defining a plurality of pipe storage layers in the pipe storage bin;
   (g) wherein the pipe storage bin is further comprised of a bin frame, wherein the pipe storage bin is further comprised of a pipe rack carried by the bin frame, and wherein the pipe rack is vertically reciprocable relative to the bin frame in order to cause the pipe storage layers sequentially to be vertically aligned with the bin dispensing position;
   (h) wherein the spacer mechanism is comprised of a spacer bar assembly, wherein the spacer bar assembly provides a separation between two adjacent pipe storage layers comprising an upper adjacent pipe storage layer and a lower adjacent pipe storage layer, wherein the spacer bar assembly is comprised of a spacer bar, and wherein the spacer bar is extendible within the pipe rack to an extended position in which the spacer bar is above the lower adjacent pipe storage layer;
   (i) wherein the spacer bar is adapted to be supported by the pipe sections in the lower adjacent pipe storage layer when the spacer bar is in the extended position and wherein the spacer bar is vertically reciprocable with the pipe rack relative to the bin frame when the spacer bar is in the extended position;
   (j) wherein the spacer bar is comprised of a spacer bar pivot axis and wherein the spacer bar is pivotable about the spacer bar pivot axis relative to the bin frame in order to move between the extended position and a withdrawn position in which the spacer bar is withdrawn from the pipe rack;
   (k) wherein the spacer bar assembly is further comprised of a spacer bar actuator for selectively moving the spacer bar between the extended position and the withdrawn position as the pipe rack reciprocates relative to the bin frame;
   (l) wherein the spacer bar actuator is comprised of a spacer bar stop for engaging the spacer bar substantially in horizontal alignment with the spacer bar pivot axis in order to limit the reciprocation of the spacer bar in an upward vertical direction; and
   (m) wherein the spacer bar stop is associated with the bin frame and wherein the spacer bar stop is positioned such that the spacer bar stop engages the spacer bar as the spacer bar reciprocates in the upward vertical direction to a spacer bar stop position at which the upper adjacent pipe storage layer is vertically aligned above the bin dispensing position and the lower adjacent pipe storage layer is vertically aligned below the bin dispensing position.

2. The apparatus as claimed in claim 1 wherein the spacer bar actuator is further comprised of a spacer bar pivoting member for engaging the spacer bar to cause the spacer bar to pivot about the spacer bar pivot axis when the spacer bar stop is engaged with the spacer bar and wherein the spacer bar pivoting member is horizontally offset from the spacer bar pivot axis.

3. The apparatus as claimed in claim 2 wherein the spacer bar pivoting member is associated with the pipe rack so that the spacer bar pivoting member reciprocates with the pipe rack relative to the bin frame.

4. The apparatus as claimed in claim 3 wherein the spacer bar pivoting member is substantially vertically aligned with the spacer bar when the spacer bar is in the extended position.

5. The apparatus as claimed in claim 4 wherein the spacer bar pivoting member is comprised of a pivot plate and wherein the pivot plate is comprised of a pivot surface for engaging the spacer bar in order to cause the spacer bar to pivot about the spacer bar pivot axis.

6. The apparatus as claimed in claim 4 wherein the spacer bar assembly is further comprised of a spacer bar guideway associated with the bin frame for retaining and guiding the spacer bar, wherein the spacer bar pivot axis is contained within the spacer bar guideway, and wherein the spacer bar stop is located within the spacer bar guideway.

7. The apparatus as claimed in claim 6, wherein the spacer bar assembly is further comprised of a latch mechanism for supporting the spacer bar in the spacer bar guideway when the spacer bar is in the withdrawn position.

8. The apparatus as claimed in claim 7 wherein the latch mechanism permits the spacer bar to reciprocate within the spacer bar guideway when the spacer bar is in the extended position.

9. The apparatus as claimed in claim 8 wherein the latch mechanism is comprised of a detent which extends within the spacer bar guideway to support the spacer bar when the spacer bar is in the withdrawn position and which substantially retracts from the spacer bar guideway when the spacer bar moves from the withdrawn position to the extended position.

10. The apparatus as claimed in claim 9 wherein the latch mechanism is further comprised of a detent engagement surface, wherein the spacer bar is comprised of the detent engagement surface, and wherein the detent engagement surface depresses the detent when the spacer bar moves from the withdrawn position to the extended position.

11. The apparatus as claimed in claim 10 wherein the pipe storage bin is comprised of a plurality of the spacer bar assemblies for defining the plurality of pipe storage layers in the pipe storage bin.

12. The apparatus as claimed in claim 10 wherein the pipe storage bin is comprised of three spacer bar assemblies for defining four pipe storage layers in the pipe storage bin.

13. The apparatus as claimed in claim 11 wherein the spacer bar pivoting member for each of the spacer bar assemblies is comprised of a single pivot plate, wherein the pivot plate is comprised of a plurality of pivot surfaces for engaging the spacer bars in order to cause the spacer bars to pivot about their respective spacer bar pivot axes, and wherein each of the pivot surfaces is substantially vertically aligned with one of the spacer bars.

14. The apparatus as claimed in claim 11 wherein the apparatus is comprised of two pipe storage bins and wherein the pipe handling device is located adjacent to the inboard side of each of the two pipe storage bins so that the pipe handling device is between the two pipe storage bins.

15. The apparatus as claimed in claim 14 wherein the two pipe storage bins are configured so that the pipe sections stored in one of the storage bins have a diameter which is different from the diameter of the pipe sections stored in the other of the storage bins.

16. The apparatus as claimed in claim 11 wherein the plurality of spacer bar assemblies is further comprised of a plurality of forward spacer bar assemblies for defining the plurality of pipe storage layers in the pipe storage bin and a plurality of rearward spacer bar assemblies for defining the plurality of pipe storage layers in the pipe storage bin.

17. The apparatus as claimed in claim 1 wherein the pipe transfer device is comprised of a pipe transfer arm, wherein the pipe transfer arm has an upper end and a lower end, and wherein the pipe transfer arm is pivotable about the lower end to transfer the selected pipe section between the bin dispensing position and the pipe transfer position.

18. The apparatus as claimed in claim 17 wherein the pipe transfer arm has a length and wherein the pipe transfer arm is extendible and retractable in order to adjust the length of the pipe transfer arm in order to transfer the selected pipe section between the bin dispensing position and the pipe transfer position.

19. The apparatus as claimed in claim 18 wherein the pipe transfer arm is comprised of a pipe supporting surface located at the upper end of the pipe transfer arm, for supporting the selected pipe section as it is transferred between the bin dispensing position and the pipe transfer position.

20. The apparatus as claimed in claim 19 wherein the pipe transfer position is substantially fixed.

21. The apparatus as claimed in claim 1 wherein the pipe handling device is comprised of a pipe clamping mechanism for holding the selected pipe section as it is moved between the pipe transfer position and the drilling head interface position.

22. The apparatus as claimed in claim 21, further comprising a pipe diameter sensing device for providing an indication of a diameter of the selected pipe section before it is clamped by the pipe clamping mechanism.

23. The apparatus as claimed in claim 22 wherein the pipe diameter sensing device is operatively connected with the pipe transfer device and wherein the pipe transfer device is configured to automatically position the selected pipe section in response to the indication from the pipe diameter sensing device so that the selected pipe section is held substantially concentrically by the pipe clamping mechanism when it is clamped at the pipe transfer position by the pipe clamping mechanism.

24. The apparatus as claimed in claim 21 wherein the pipe handling device is comprised of a primary pipe handling arm, wherein the primary pipe handling arm has an upper end and a lower end, and wherein the primary pipe handling arm is pivotable about the lower end to move the selected pipe section between the pipe transfer position and the drilling head interface position.

25. The apparatus as claimed in claim 24 wherein the pipe handling device is further comprised of a secondary pipe handling arm, wherein the secondary pipe handling arm is pivotably connected with the upper end of the primary pipe handling arm, and wherein the secondary pipe handling arm is pivotable to move the selected pipe section between the pipe transfer position and the drilling head interface position.

26. The apparatus as claimed in claim 25 wherein the primary pipe handling arm pivots greater than ninety degrees between the pipe transfer position and the drilling head interface position and wherein the secondary pipe handling arm pivots so that the selected pipe section is substantially in a horizontal orientation at the pipe transfer position and so that the selected pipe section is substantially in a vertical orientation at the drilling head interface position.

27. The apparatus as claimed in claim 26, further comprising a derrick for supporting the drilling head, wherein the derrick defines an interior derrick space, and wherein the drilling head interface position is located substantially within the interior derrick space.

28. The apparatus as claimed in claim 27 wherein the derrick defines an open side and wherein the selected pipe section is passed through the open side of the derrick to the interior derrick space as the selected pipe section moves from the pipe transfer position to the drilling head interface position.

29. The apparatus as claimed in claim 28, further comprising the drilling head, wherein the drilling head interface position is substantially vertically aligned with the drilling head.

30. The apparatus as claimed in claim 29 wherein the apparatus is mounted on a self-propelled vehicle.

31. The apparatus as claimed in claim 30 wherein the self-propelled vehicle is a truck.

* * * * *